(12) United States Patent
Goldberg et al.

(10) Patent No.: US 7,836,770 B2
(45) Date of Patent: Nov. 23, 2010

(54) METHOD AND SYSTEM FOR NOISE DOSIMETER WITH QUICK-CHECK MODE AND EARPHONE ADAPTER

(75) Inventors: Jack Goldberg, San Diego, CA (US); Gregory A. Flamme, Portage, MI (US); Dana S. Helmink, Elk Grove Village, IL (US); Mead C. Killion, Elk Grove Village, IL (US)

(73) Assignee: Etymotic Research, Inc., Elk Grove Village, IL (US)

( * ) Notice: Subject to any disclaimer, the term of this patent is extended or adjusted under 35 U.S.C. 154(b) by 866 days.

(21) Appl. No.: 11/654,419

(22) Filed: Jan. 17, 2007

(65) Prior Publication Data

US 2007/0186656 A1 Aug. 16, 2007

Related U.S. Application Data

(63) Continuation-in-part of application No. 11/643,328, filed on Dec. 20, 2006.

(60) Provisional application No. 60/752,761, filed on Dec. 20, 2005, provisional application No. 60/759,460, filed on Jan. 17, 2006, provisional application No. 60/760,564, filed on Jan. 20, 2006.

(51) Int. Cl.
*G01H 11/06* (2006.01)
*H04R 1/10* (2006.01)

(52) U.S. Cl. ............... 73/647; 73/642; 381/74; 181/130

(58) Field of Classification Search ............ 73/646, 73/647, 585, 642; 381/58; 181/130
See application file for complete search history.

(56) References Cited

U.S. PATENT DOCUMENTS

| | | | | |
|---|---|---|---|---|
| 3,802,535 | A * | 4/1974 | Peake et al. | 73/646 |
| 4,277,980 | A * | 7/1981 | Coats et al. | 73/646 |
| 5,180,967 | A * | 1/1993 | Yamazaki | 323/315 |
| 5,757,930 | A * | 5/1998 | Seidemann et al. | 381/60 |
| 5,970,795 | A * | 10/1999 | Seidmann et al. | 73/585 |
| 6,456,119 | B2 * | 9/2002 | Fischer | 326/105 |
| 6,507,650 | B1 * | 1/2003 | Moquin | 379/387.01 |
| 6,826,515 | B2 * | 11/2004 | Bernardi et al. | 702/191 |
| 7,058,190 | B1 * | 6/2006 | Zakarauskas et al. | 381/122 |
| 2003/0191609 | A1* | 10/2003 | Bernardi et al. | 702/191 |
| 2009/0272192 | A1* | 11/2009 | Killion et al. | 73/647 |

* cited by examiner

*Primary Examiner*—J M Saint Surin
(74) *Attorney, Agent, or Firm*—McAndrews, Held & Malloy, Ltd.

(57) ABSTRACT

A noise dosimeter with capability to rapidly predict noise exposure over an extended time period based on a measurement of short duration. Either an acoustic or an electrical earphone adapter provides a convenient means to connect the noise dosimeter to an external sound source. A direct input jack operable to receive at least one audio signal provides a signal to an RMS detector, which provides a DC signal to a two-stage amplifier circuit. The outputs of the amplifiers are provided to a processor having multiple A/D channels. The processor calculates accumulated noise doses and drives a display, which in one embodiment includes a panel of light-emitting diodes. In one embodiment, the dosimeter includes functionality for control of external devices such as sound boards.

19 Claims, 14 Drawing Sheets

METHOD AND SYSTEM FOR NOISE DOSIMETER WITH QUICK-CHECK MODE AND EARPHONE ADAPTER

CROSS-REFERENCE TO RELATED APPLICATIONS/INCORPORATION BY REFERENCE

The present application is a continuation-in-part and claims priority under 35 U.S.C. §120 to copending U.S. patent application Ser. No. 11/643,328, filed on Dec. 20, 2006 which claims priority under 35 U.S.C. §119(e) to provisional application Ser. No. 60/752,761, filed on Dec. 20, 2005, the entire contents of each prior-filed application are hereby expressly incorporated herein by reference. The present application claims priority under 35 U.S.C. §119(e) to provisional application Ser. No. 60/759,460, filed on Jan. 17, 2006, the entire contents of which are hereby expressly incorporated herein by reference. The present application claims priority under 35 U.S.C. §119(e) to provisional application Ser. No. 60/760,564, filed on Jan. 20, 2006, the entire contents of which are hereby expressly incorporated herein by reference.

FIELD OF THE INVENTION

Certain embodiments of the invention relate to noise monitoring. More specifically, certain embodiments of the invention relate to a method and system for a personal noise dosimeter with an earphone adapter and capability to rapidly predict noise exposure based on a measurement of short duration.

BACKGROUND OF THE INVENTION

A noise dosimeter is a device which incorporates a sound level measurement subsystem and a methodology for accumulating the sound level over time. ANSI S.125-1991 is the current American National Standard Specification for Personal Noise Dosimeters, a comprehensive standard that describes how a standard noise dosimeter should function. The result of a noise dose measurement over time may be what is known as the "equivalent continuous sound level", denoted as $L_{eq}$. A noise dose might also be expressed as a percentage of "criterion exposure." The "criterion sound level", for example 85 dB, is the level of sound, which having been applied continuously for a duration equal to the "criterion time," for example 8 hours, results in a 100% criterion exposure. These calculations are completely specified in the standard and are well known in the industry.

Many environments expose individuals to excessively loud sounds. These loud sounds include, for example, music concerts, industrial manufacturing environments, construction and environments involving the use of heavy machinery, etc. The US government regulates, through OSHA (Occupational Safety and Health Administration), noise exposure levels in work environments. There are many noise dosimeters on the market, which are used to monitor noise in the work environment. These regulations and devices represent a level of protection for many American workers.

There are other environments, in which loud noises exist, that are far less regulated. Therefore, the development of a low cost noise dosimeter is needed to provide individuals or organizations with an inexpensive and simple means of monitoring noise exposure.

Existing devices used for measuring loud noises have several problems. For example, existing devices tend to be too complicated for operation by the average user, and they are generally too expensive for the average user, in that they are primarily designed for use by technically trained personnel in an industrial environment, which is reflected in their cost and complexity. Further, existing devices can be inappropriate to wear in most social occasions and situations and may also have insufficient accuracy, precision and/or flexibility. Additionally, existing devices are designed for use over an extended period of time, e.g. 8 hours, and therefore cannot rapidly predict noise exposure in situations where the listener is exposed to sound that is of a similar nature for an extended period, such as music at a concert or music presented through headphones.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a personal noise dosimeter, substantially as shown in and/or described in connection with at least one of the figures, as set forth more completely in the claims.

One embodiment of the present invention is a noise dosimeter having the capability to rapidly predict noise exposure in situations where the listener is exposed to sound that is of a substantially similar nature for an extended period.

Another embodiment of the present invention is a noise dosimeter having the capability to rapidly predict noise exposure in situations where the listener is exposed to sound that is of a substantially similar nature for an extended period and having the capability to receive an electrical signal representative of the sound which would be presented to a user of an earphone or earphone bud connected to an external sound-producing device.

Another embodiment of the present invention is a noise dosimeter having the capability to rapidly predict noise exposure in situations where the listener is exposed to sound that is of a substantially similar nature for an extended period and having the capability to receive an acoustic signal representative of the sound which would be presented to a user of an earphone or earphone bud connected to external sound-producing device.

Another embodiment of the present invention is directed towards a noise dosimeter having the capability to rapidly predict noise exposure in situations where the listener is exposed to sound that is of a substantially similar nature for an extended period and having an RMS detector and a current source. The RMS detector receives an AC signal representing an acoustic signal, converts the AC signal to a DC signal, and provides the DC signal at an output of the RMS detector. The current source is operable to inject current into the output of the RMS detector.

Another embodiment of the present invention is directed to a method of determining an offset voltage in a noise dosimeter having the capability to rapidly predict noise exposure in situations where the listener is exposed to sound that is of a similar nature for an extended period and having a microphone that provides an AC signal to an RMS detector, which converts the AC signal to a DC signal. Pursuant to the method, the microphone is turned off when an offset is to be determined. A signal that is representative of an output of the RMS detector is measured while the microphone is turned off.

Another embodiment of the present invention is directed to a noise dosimeter having the capability to rapidly predict noise exposure in situations where the listener is exposed to sound that is of a substantially similar nature for an extended period and having an RMS detector, first and second amplifier, and a processor. The RMS detector receives an AC signal representing an acoustic signal, converts the AC signal to a DC signal, and provides the DC signal at an output of the RMS detector. The first amplifier receives the output of the RMS detector and amplifies signals of all levels. The second amplifier receives an output of the first amplifier and amplifies relatively lower level signals. The processor comprises an analog-to-digital converter (A/D) having multiple channels. A first A/D channel receives an output of the first amplifier. A second A/D channel receives an output of the second amplifier. The processor calculates an accumulated noise dose based on the outputs of the analog-to-digital converter.

Another embodiment of the present invention is directed to a noise dosimeter having the capability to rapidly predict noise exposure in situations where the listener is exposed to sound that is of a substantially similar nature for an extended period and having functionality that measures an accumulated noise dose over time, and an interface that communicates information regarding an accumulated noise dose to a second device.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a personal noise dosimeter. More specifically, the present invention relates to a noise monitoring system and method for continuously and accurately monitoring an individual's noise exposure.

The personal noise dosimeter of the present invention may be inexpensive and provide adequate performance to the user. Some of the parameters used to evaluate the personal noise dosimeter may be its cost, size, battery life, and performance. A balance of these parameters may be achieved to arrive at a useful device. Calculation of the noise dose in the present invention may be consistent with ANSI S1.25-1991, as shown below:

| | |
|---|---|
| Exchange rate | 3 dB |
| Criterion level | 85 dB |
| Threshold level | 80 dB |
| Criterion time | 8 hrs |
| Frequency weighting | A |
| Time weighting | Slow |

Flexibility in the dosimeter design may allow exchange rates of 3, 4, or 5 dB; criterion levels of from 75 to 90 dB, and threshold levels of from 75 to 85 dB.

Figure 1:
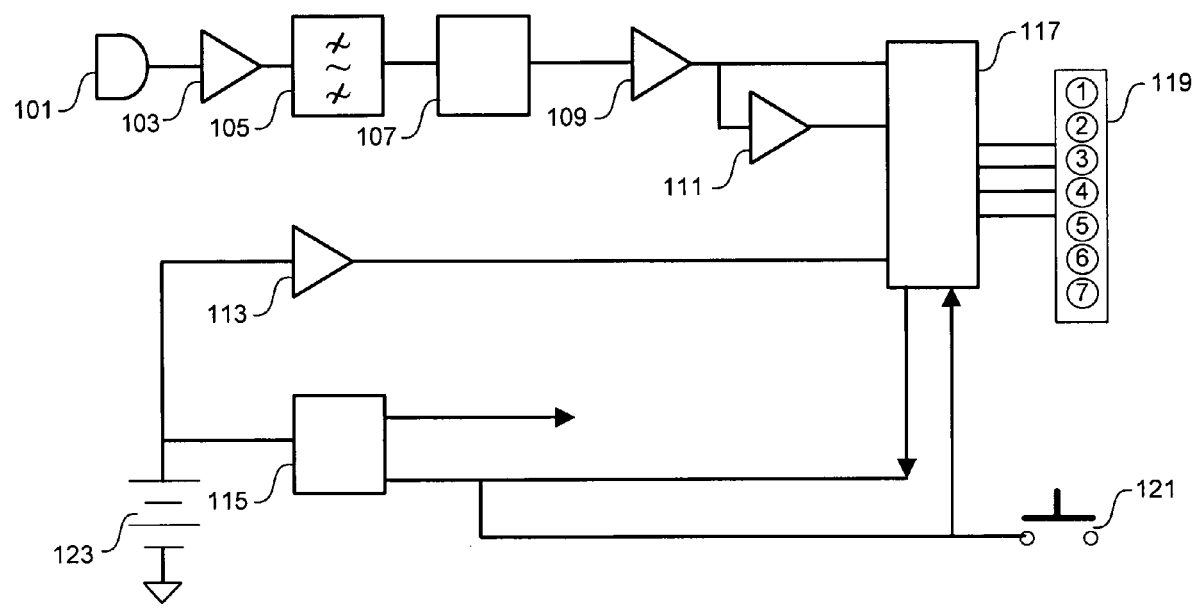
FIG. 1 illustrates a block diagram of an exemplary noise dosimeter system, in accordance with an embodiment of the present invention.

FIG. 1 illustrates a block diagram of an exemplary noise dosimeter system, in accordance with an embodiment of the present invention. The noise dosimeter system comprises a microphone 101, a filter 105, a root mean square (RMS) detector 107, a microprocessor 117, a power source 123, a pushbutton 121, and a display 119. The system may additionally comprise several amplifiers 103, 109, 111, and 113, and a voltage regulator 115.

The power source 123 may be, for example, batteries. In an embodiment of the present invention, three AAAA alkaline batteries are used as the power source 123. These batteries may provide the noise dosimeter with battery life as long as 250 hours.

The microprocessor 117 comprises program memory, data memory, an analog to digital converter, timers, a clock oscillator, and various lines for input and output. The program memory contains the dosimeter firmware, which is the computer program that operates the dosimeter and performs computations.

The display 119 may comprise, for example, a number of LEDs (light emitting diodes). A pattern of blinking or duration of the LEDs may be indicative of different activities and functionalities occurring in the noise dosimeter such as, for example, an error. When an error occurs in the noise dosimeter, the display 119 may flash LEDs 1 and 3, and LEDs 2 and 4 three times, for example, as an error indication and then turn off.

The noise dosimeter may operate in three modes: a normal (NORMAL) mode, a quick check (QUICK-CHECK) mode and a calibration (CAL) mode. Operation in NORMAL mode may be initiated by pressing and releasing the pushbutton 121 and may be carried out by the user of the noise dosimeter.

Operation in QUICK-CHECK mode may be initiated by pressing and holding the pushbutton 121 for a few seconds, then releasing it. Operation in CAL mode may not be available to the user without a special tool available to, for example, service personnel. The CAL mode may be used for checking the calibration of the noise dosimeter or recalibrating the noise dosimeter. The calibration may be carried out by a manufacturer of the noise dosimeter or a service technician.

The noise dosimeter begins operating in a NORMAL mode by pressing and releasing the pushbutton 121. LED7 may be lit while the pushbutton 121 is depressed. If the power source 123 is not weak or dead, immediately after releasing the pushbutton 121, LEDs 1 through 6 flash and the dosimeter then begins operation in the NORMAL mode. If the power source 123 is weak, for example less than 3.5V, the unit may show the error indication as a warning when the pushbutton 121 is released and then start up, flashing LEDs 1 through 6 in succession. If the power source 123 is "dead", for example less than 3.2V, the unit may show the error indication twice in succession and then turn off.

During an initial period of NORMAL mode operation, for example 20 seconds, the instrument self-checks and LED 1 may slowly blink. Alternatively, the display may indicate during an initial period the result of the previous noise dose measurement. During this initial period the system firmware may measure two internal offset voltages. Knowledge of the internal offset(s) may allow the dosimeter to work more accurately over a wider dynamic range. If during the self-check an error occurs, the dosimeter may show the error indication and turn off. Additionally, during the initial period of operation, the dosimeter may be turned off by pressing and releasing the pushbutton 121.

After the initial period of operation, if no errors occur and the dosimeter not turned off, the dosimeter actively accumulates noise dose. Noise dose accumulation continues until the user presses and holds the pushbutton 121 for a short period, for example 3 seconds, or a certain amount of time of operation has elapsed, for example, 16 hours. The display 119 may indicate accumulated noise dose as described by Table 1 below. In an illustrative embodiment of the present invention, LEDs 1 and 2 are green, LED 3 is yellow and LEDs 4-7 are red. Thus when the accumulated dose is less than 100%, the LED that is lit (or blinking) is green, when the accumulated dose is between 100% and 200%, the LED that is lit is yellow, and when the accumulated dose is more than 200%, the LED that is lit is red. This quickly, clearly and inexpensively communicates information to the user regarding the accumulated noise dose. Other noise dose levels and LED combinations can also be used to achieve these objectives.

TABLE 1

NORMAL mode display options

| | |
|---|---|
| <25% dose | slow blink LED 1 (once every ~1.3 secs) |
| 25%-50% dose | blink LED1 (once every ~.65 secs) |
| 50%-100% dose | blink LED 2 |
| 100%-200% dose | blink LED 3 |
| 200%-400% dose | blink LED 4 |
| 400%-1600% dose | blink LED 5 |
| 1600%-3200% dose | blink LED 6 |
| >3200% dose | blink LED 7 |

The dosimeter, while in NORMAL mode, may save data in its memory representative of the present accumulated noise dose every few minutes, for example, every 8 minutes. The saved data of the noise dose may be downloaded to a computer. Up to 16 hours of data (120 dose values or 240 bytes) may be stored in the dosimeter, and this data may indicate the accumulated noise dose to a resolution of better than 0.1% in the range of 0 to approximately 12800%. Other data that may be downloaded to a computer may be, for example, the firmware revision level, the exchange rate, the criterion level, the threshold level, and the internal calibration values.

The noise dosimeter begins operation in the QUICK-CHECK mode by pressing the pushbutton 121 and holding it down for a duration of, for example, 2 seconds. When the pushbutton 121 is pressed, LED7 is lit. When 2 seconds have elapsed, LEDs 1 through 6 may flash in succession to indicate entry into the QUICK-CHECK mode. If the power source 123 is not weak or dead, immediately after releasing the pushbutton 121, LEDs 1 through 6 flash and the dosimeter begins operation in the QUICK-CHECK mode. If the power source 123 is weak, for example less than 3.5V, the unit may show the error indication as a warning when the pushbutton 121 is released and then start up, flashing LEDs 1 through 6 in succession. If the power source 123 is "dead", for example less than 3.2V, the unit may show the error indication twice in succession and then turn off.

When the noise dosimeter is operating in NORMAL mode, the noise dosimeter measures and displays the accumulated Noise Dose in accordance with a methodology for accumulating the sound level over time, for example ANSI S.125-1991. While in QUICK-CHECK mode, the instrument measures and accumulates the noise dose for a brief period, such as 1/32 of an hour or 112.5 seconds, and then displays the projected noise dose as if the accumulation were for a significantly longer period, for example, 1 hour. This mode may be especially useful to quickly estimate the noise exposure one would experience if listening to a particular sound source, such as a portable music player, for one hour. ANSI S.125-1991 defines the average sound level over a particular duration and if the average sound level during the 112.5 seconds measurement period is the same as that which would exist were the sound measured over a full hour, then an embodiment of the invention running the QUICK-CHECK mode will precisely predict the 1 hour noise exposure after performing a 112.5 second measurement. For example, the user might play a single song on the portable music player and based on a measurement which is completed in less than 2 minutes, predict his or her exposure to that same sort of music for an entire hour.

During an initial period of QUICK-CHECK mode operation, for example 20 seconds, the instrument self-checks and LED 1 may slowly blink. Alternatively, the display may indicate during an initial period the result of the previous noise dose measurement. During this initial period the system firmware may measure two internal offset voltages. Knowledge of the internal offset(s) may allow the dosimeter to work more accurately over a wider dynamic range. If during the self-check an error occurs, the dosimeter may show the error indication and turn off. Additionally, during the initial period of operation, the dosimeter may be turned off by pressing and releasing the pushbutton 121.

After the initial period of operation, if no errors occur and the dosimeter is not turned off, the dosimeter actively accumulates noise dose. Noise dose accumulation continues until the user presses and holds the pushbutton 121 for a short period, for example 3 seconds, or a predetermined amount of time of operation has elapsed, for example, 1/32 of an hour or 112.5 seconds.

During QUICK-CHECK mode, the noise dosimeter integrates sound level for a brief period, for example 1/32 of an hour, rather than the much longer integration period used in NORMAL mode. The result may be displayed in the same manner as in NORMAL mode as show in Table 1 hereinabove. Data held in memory (discussed more below) will be over-written the next time the unit is turned on in either QUICK-CHECK or NORMAL mode, so if a user wishes to download the dose data to a computer, the user may do so before starting another measurement.

Figure 2:
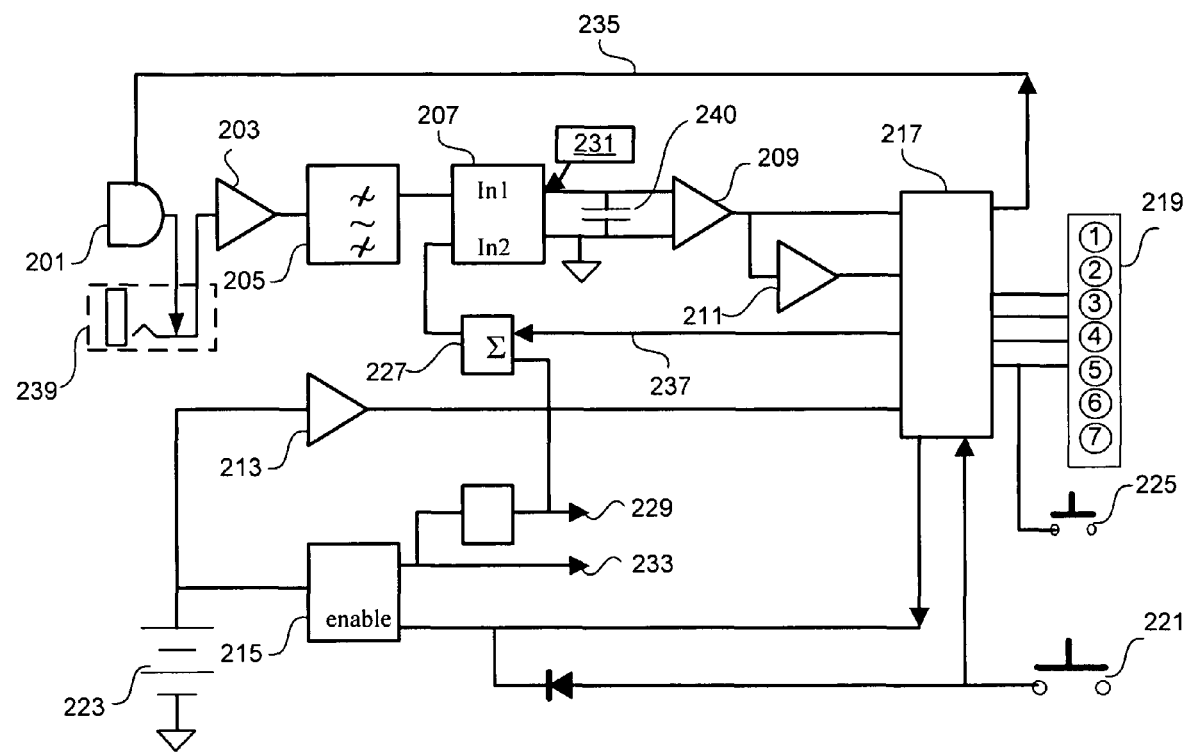
FIG. 2 illustrates a block diagram of exemplary circuitry of the noise dosimeter, in accordance with an embodiment of the present invention.

FIG. 2 illustrates a block diagram of exemplary circuitry of the noise dosimeter, in accordance with an embodiment of the present invention. In this embodiment, the noise dosimeter circuitry comprises a microphone 201, an input amplifier 203, an A weighting filter 205, an RMS detector 207, a capacitor 240, two DC amplifiers 209 and 211, one amplifier 209 for amplifying signals of all levels and the other amplifier 211 for amplifying lower level signals, a microcontroller 217, a LED display 219, a power source 223, a voltage regulator 215, and pushbuttons 221 and 225. The microcontroller 217 comprises an integral analog-to-digital converter and integral memory for program and data storage. The LED display 219 comprises 7 LEDs. The power source 223 comprises batteries. The pushbutton 221 is user-accessible, whereas, the CAL pushbutton may not be user-accessible, and only be accessible to manufacturing or service personnel for calibration purposes.

The noise dosimeter begins operation in the CAL mode by pressing and releasing the pushbutton 221 while CAL pushbutton 225 is also pressed. When the pushbutton 221 is pressed, LED7 is lit. If the power source 223 is not weak or dead, immediately after releasing both pushbuttons 221 and 225, the dosimeter operates in the CAL mode. If the power source 223 is weak, for example less than 3.5V, the unit may show the error indication as a warning when the pushbuttons 221 and 225 are released and then start up in NORMAL mode rather than in CAL mode. This prevents the recalibration of the dosimeter when it is running with weak batteries. If the power source 223 is "dead", for example less than 3.2V, the unit may show the error indication twice in succession and then turn off.

During an initial period of CAL mode operation, for example 20 seconds, the instrument self-checks and LEDs 1 through 6 may repeatedly flash in succession. During this initial period the system firmware may measure two internal offset voltages. Knowledge of the internal offset(s) may allow the dosimeter to work more accurately over a wider dynamic range. If during the self-check an error occurs, the dosimeter may show the error indication and turn off. Additionally, during the initial period of operation, the dosimeter may be turned off by pressing and releasing the pushbutton 121.

After the initial period of operation, if no errors occur and the dosimeter is not turned off, the dosimeter operates in the CAL mode and actively measures and displays sound level. CAL mode operation continues until the user presses the pushbutton 221, or a predetermined amount of time of operation has elapsed, for example 18 minutes.

During the CAL mode, the dosimeter functions like a sound level meter with 5 dB resolution and a range of from 70 dB to 130 dB sound pressure level (SPL). When the sound pressure level as measured by the dosimeter is 94 dB±1.5 dB, LEDs 3 and 4 both flash. This flashing pattern may be utilized to check the dosimeter calibration. CAL mode may be also used during manufacturing and service of the dosimeter to adjust the sensitivity of the microphone 101 or for other calibration tasks.

In CAL mode, the dosimeter may display sound level as described by Table 2 below.

TABLE 2

| CAL mode display options | |
|---|---|
| less than 72.5 dB | LED1 |
| 72.5 to 77.5 dB | LED1 + LED2 |
| 77.5 to 82.5 dB | LED2 |
| 82.5 to 87.5 dB | LED2 + LED3 |
| 87.5 to 92.5 dB | LED3 |
| 92.5 to 95.5 dB | LED3 + LED4 blinking together |
| 95.5 to 97.5 dB | LED3 + LED4 |
| 97.5 dB to 102.5 dB | LED4 |
| 102.5 dB to 107.5 dB | LED4 + LED5 |
| 107.5 dB to 112.5 dB | LED5 |
| 112.5 dB to 117.5 dB | LED5 + LED6 |
| 117.5 dB to 122.5 dB | LED6 |
| 122.5 dB to 127.5 dB | LED6 + LED7 |
| greater than 127.5 dB | LED7 |

Referring again to FIG. 2, an acoustic signal is captured by the microphone 201, amplified by the amplifier 203, and filtered by the A weighting filter 205. The RMS detector 207 then processes the signal. The time constant of the RMS detector is determined by a capacitor 240. The slow-moving DC output of the RMS detector 207 is then amplified in two stages. The first stage, amplifier 209, amplifies signals of all levels, and in another stage, the low level signals may be amplified by the amplifier 211. The outputs of the amplifiers 209 and 211 are then applied to two input channels of the microcontroller 217. The two inputs are sent to the integral analog to digital converter within the microcontroller 217. The microcontroller then processes the RMS-detected and amplified signals and outputs the results to an array of seven LEDs of the display 219.

The circuitry may also comprise hardware control for measurement of offsets, the injection of a small amount of current into the output terminal of the RMS detector, the generation of the 1.5V virtual ground, and an A/D channel for checking the battery strength.

Firmware stored in the microcontroller memory may include algorithms to substantially minimize the effect of the offsets on noise dose measurements.

The power source 223 may, for example, be 3 AAAA batteries. A regulator 215, which is enabled or disabled with a logic signal from the microcontroller 217, regulates the power source 223. The regulator 215 may be, for example, a 3-volt regulator. For audio signal processing, virtual ground reference 229 of, for example 1.5V, is generated and used in both the input amplifier 203 and the A weighting filter 205 stages. The 1.5-volt virtual ground 229 is connected to summer 227 and then to the second input, IN2 of the RMS detector 207, acting as the reference for the audio signal being input at the first input, IN1. The power source 223 is connected to operational amplifier 213, which both isolates the battery from the microcontroller and adjusts the battery voltage to be a proper level for detection by the A/D channel of the microcontroller 217 for checking the battery strength. The microcontroller 217 checks the strength of the power source 223 at startup and indicates whether the battery is weak (in which case the system will start up with a warning) or dead (in which case the system will not start up). Pressing the user-accessible pushbutton 221 causes the circuitry to turn on by enabling the regulator 215. Thereafter an output from the microcontroller 217 may continue to enable the regulator 215 or turn off the circuitry.

The RMS detector 207 converts an AC signal at its input to a slow-moving DC output signal at a level equal to the rootmean-square value of the input. For example, RMS detector, model LTC1966 manufactured by Linear Technology may be utilized. Linear Technology specifies that the LTC1966 exhibits constant bandwidth independent of input voltage, better than ±1.5 dB to 10 KHz; better than 0.1% linearity; high accuracy of better than 0.25% from 50 Hz to 1 KHz; a dynamic range of greater than 40 dB; and low supply current of less than 200 μa. The maximum differential input voltage at the detector is 1 volt. At 200 mV input, a crest factor of 4 causes negligible error.

If the output of the RMS detector 207 is too small, performance may degrade. An embodiment of the noise dosimeter of the present invention avoids this problem by injecting a small amount of current, using a current source 231, into the output of the RMS detector 207. This small amount of current forces the output of the RMS detector 207 to be large enough to avoid the region near zero, thus minimizing uncalibratable errors. Additionally, the offsets created by the current injection and due to other causes may be measured and corrected. The noise dosimeter of the present invention, by virtue of its correction for the offset errors which can occur at small output levels, has a dynamic range of approximately 60 dB.

The microphone 201 may operate using a regulated 3V supply 233. One exemplary microphone 201 has a diameter equal to 4.5 mm, exhibits a flat frequency response to better than ±1 dB from 100 Hz to 15 KHz, and is omni-directional. The nominal microphone sensitivity in this embodiment is −44 dB±4 dB re 1V for 94 dB SPL at 1 KHz. Thus, for example, an input at 130 dB SPL, a desired upper limit for the design, the microphone output will be −8 dB re 1V nominally, or about 400 mV RMS.

In an embodiment of the present invention, the gain between the microphone output and the RMS detector input is approximately +5 dB. The amplifier 203 may have a gain of approximately 8 dB, the network preceding the amplifier may have a loss of about 0.2 dB at 1 KHz and the passive filter following the first stage may have a loss of about 2.7 dB at 1 KHz. The manner in which the A-weighting frequency characteristic may be implemented is discussed hereinafter.

Using a nominal microphone (−44 dB sensitivity), for example, a 130 dB SPL input at 1 Khz results in an RMS signal of (130−94)−44+5 or −3 dB re 1V at the detector input. Thus, a 130 dB SPL input to the noise dosimeter results in a signal at the detector of 1V peak (2V peak to peak).

In an embodiment of the invention, where a direct signal input is desired, the user may attach the signal source to the direct input 239, where the direct input 239 may be a jack. When a direct input is connected, the microphone 201 is disconnected and the processor is informed of the connection. An input to microcontroller, not shown, may be used in order for the microcontroller to be aware of the presence of direct audio input. Sensitivity at the direct input jack 239 may be designed such that 10 mV RMS AC is the equivalent of 94 dB SPL. In one embodiment of the invention, the input circuitry of the noise dosimeter serves a filtering function consistent with achieving A frequency weighting. In this case, the impedance that the dosimeter sees when a direct audio input is utilized will affect its frequency response and any audio signal source connected to jack 239 must present the proper impedance to the dosimeter to maintain its proper frequency weighting.

The output of the RMS detector 207 may drive two DC amplifier stages with amplifiers 209 and 211, with both amplifier outputs connected to the multiplexed analog-to-digital converter that is included in the microcontroller. The first amplifier 209, for example, has a gain of about 4.24× and the second amplifier 311 has a gain of 32×. The nominal top of scale level at the detector output (130 dB SPL with nominal mic) results in a detector output of 0.707 VDC, which when amplified 4.24 times results in a 3V level at the A/D input. If the microcontroller is powered by 3V, this is the maximum level that can be sampled by the high A/D channel.

The second DC amplifier stage 211 further amplifies the first DC amplifier stage output by a factor of 32×. The second stage output may be connected to the low A/D channel, which in an embodiment of the invention saturates at approximately 99.9 dB SPL input in a unit having a microphone of nominal sensitivity.

A gain of 32× in the second DC amplifier is chosen to simplify the calculations in the microcontroller in that 32 is a power of 2. A different power of 2, for example, 16 or 64, may be utilized in an embodiment of the invention. Choice of the gain of the second DC amplifier is based on the measurement resolution requirements and resolution of the A/D converter.

A-weighting filtering 205 may be achieved with a 6-pole passive filter, for example. In an embodiment of the invention all of the poles are on the real axis with four of them performing a high-pass function and two of them performing a low-pass function. The pole locations may be placed approximately where specified in, for example, ANSI S1.4 as follows:

Two high pass poles at 20.6 Hz;
one high pass pole at 107.7 Hz;
one high pass pole at 737.9 Hz; and
two low pass poles at 12.2 KHz.

The noise dosimeter may achieve its frequency weighting by incorporating passive circuitry at the microphone output for one of the 12.2 KHz low pass poles and one of the 20.6 Hz high pass poles. The remaining four poles may be realized with a passive network between the output of the amplifier 203 and the input of the RMS detector 207.

The microcontroller 217 used in the design may, for example, be the PIC16F684 manufactured by Microchip Technology. That microcontroller is a 14-pin, low-power, 8-bit RISC type processor with an integral 10 bit A/D converter, an integral clock which is factory calibrated to ±1%, several timers, a 256 byte EEPROM, 2K instructions of flash program memory and 128 bytes of RAM. This microcontroller's configuration is extremely flexible and in the noise dosimeter of the present invention, 3 channels of A/D input may be utilized (two for the RMS detector 207 output and 1 for the battery strength check), 4 input-output lines for controlling the display 219 (one of which may serve the purpose of detecting pushbutton 225 during calibration), 1 input line for reading the user-accessible pushbutton, 1 output line for controlling the power supply, and 2 input-output lines used to enable calibration and correction at low input levels.

In the embodiment of FIG. 2, four output lines of the microcontroller 217 drive seven LEDs of the display 219. The arrangement of these LEDs may be such that in some cases two of them can be driven simultaneously and continuously. When the firmware rapidly multiplexes between driving one of the LEDs and driving another, the appearance of any two LEDs being turned on simultaneously can be achieved.

In the NORMAL or QUICK-CHECK modes of operation, the display 219 may indicate eight distinct levels of noise exposure, as shown above in Table 1. In the CAL mode of operation, used for calibration and diagnostic checking of the instrument, the display 219 may indicate input sound level from 70 dB to 130 dB in 5 dB increments, as shown above in Table 2.

A 10-pin connector may be utilized with the noise dosimeter to achieve several purposes. First, the noise dosimeter system may be powered from a remote supply of 3.5 to 5 volts DC using the connector. Second, the microcontroller may be programmed via the connector with a properly configured cable and programmer, an example of which is the Microchip MPLAB ICD2. Third, data stored during normal operation of the dosimeter may be accessed via the connector and a properly configured cable and interface. Fourth, the connector may enable adjustment of the calibration of the dosimeter with automated equipment to account for the unit-to-unit variability of the microphone sensitivity, for example. Fifth, the connector may be used to interface the dosimeter printed circuit board to other equipment, such as a public address system.

Programming the microcontroller 217 may be accomplished using the power and ground connections to the microcontroller 217 along with three of its other pins. These same connections may be used to read the internal EEPROM, which may store the noise dose data gathered during NORMAL mode operation. The structure of the data stored in EEPROM is described hereinafter.

In addition to the +3V power line, ground, a line for supplying remote power and the three control lines for reading and writing the microcontroller memory, four other lines are present at the 10-pin connector. These four lines are the input-output lines that control the display 219. One of these four lines may allow the adjustment of the system gain to account for the microphone sensitivity. By connecting this line to +3V, duplicating the action of the CAL pushbutton 225 in this embodiment, while the instrument is in CAL mode and while the instrument is being exposed to a reference level of 94 dB SPL, a technician or an automated calibration system may adjust the device's internal gain.

The four lines that control the display 219 may be used to control another instrument or provide real-time data regarding accumulated noise dose to another instrument, such as a public address system or mixing console. For example, a sound board at a musical concert may be interfaced to the dosimeter printed circuit board such that when the noise dose is excessive, the operator may be made aware that the sound has been too loud for too long and/or the sound board could automatically turn down in response to the increasing noise dose.

The noise dosimeter of the present invention may include hardware features and accompanying firmware capabilities that may avoid some limitations of the performance of the RMS detector such as, for example, the LTC1966. These hardware features and accompanying firmware capabilities work together to extend the usable dynamic range of the RMS detector 207. First, a current source 231, injects a small amount of current, for example 20 nA, into the output of the detector. Current source 231 may comprise a resistor network. Second, the microcontroller 217 may switch on and off the power to the microphone 201 via the connection 235, thus eliminating acoustic signals from interfering with the calibration process. Third, an additional input offset, in the form of a DC bias, may be applied to the RMS detector 207 by means of a control line to summer 227. These three steps may allow the noise dosimeter to substantially correct for errors related to small input signals and thus substantially increase the detector's dynamic range.

The current source utilized at the output of the RMS detector 207 in the noise dosimeter injects a small current of about 20 nA, for example. As a result, there may be both an additional output offset and an additional input offset created at the RMS detector 207. The LTC1966 has both inherent input and output offset errors, which vary unit-to-unit and when the output voltage is very small (close to ground), the LTC1966 becomes highly nonlinear and non-monotonic in an unpredictable manner. When configured, as in this noise dosimeter design, with 20 nA injected into its output, the response for small signals becomes monotonic although some nonlinearity remains. The effect of this remaining nonlinearity on the performance of the RMS detector and thus on the accuracy of noise dose measurements is substantially predictable and calibratable.

In an embodiment of the invention, the input and output offsets of the RMS detector 207 may be measured in the noise dosimeter design at the start of every measurement cycle. To accomplish this, the microphone is disabled thus eliminating any acoustic input signal would appear at the input of the detector. To disable the microphone, the microphone power is switched on and off with a dedicated output line 235 from the microcontroller 217 and, while the offsets are measured, the microphone power is off.

A positive offset at the input the RMS detector 207 may be established by using another dedicated output line 237 from the microcontroller 217. When this line is set to logic high (+3V), IN2 of the RMS detector 207 is moved from its normal level at virtual ground (1.5V) to approximately 1.52V.

Figure 3:
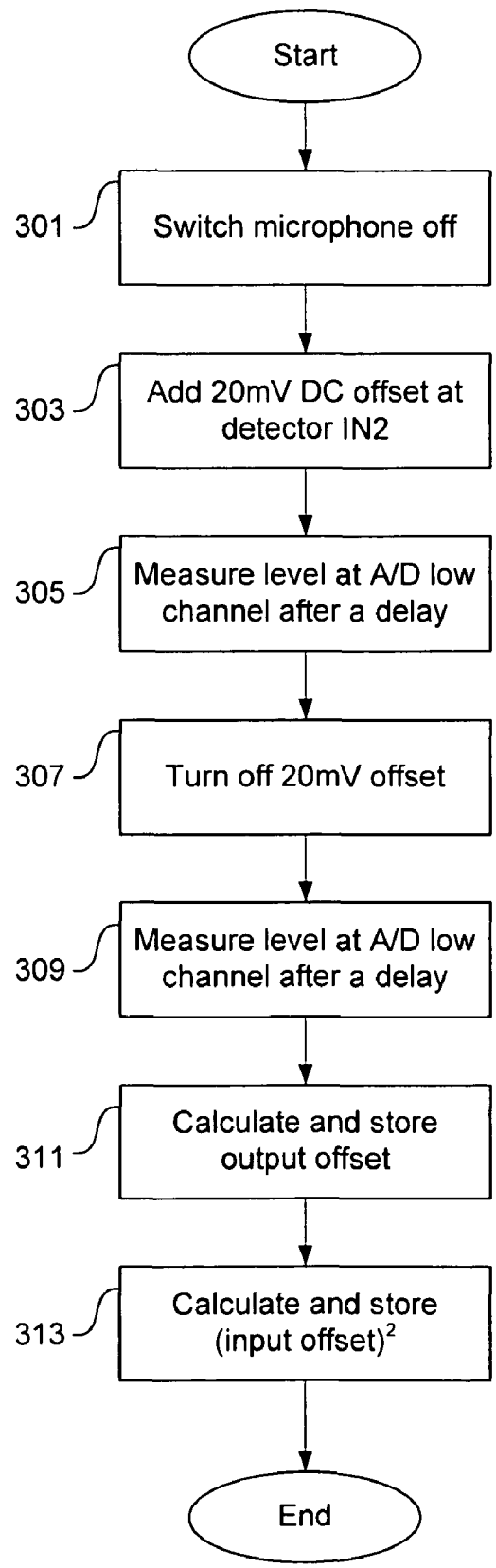
FIG. 3 illustrates a flow chart of an exemplary method for measuring input and output offsets of the RMS detector, in accordance with an embodiment of the present invention.

FIG. 3 illustrates a flow chart of an exemplary method for measuring input and output offsets of the RMS detector, in accordance with an embodiment of the present invention. At an initial step 301, the microphone 201 is switched off. The detector IN2 is then set to 1.52V, 20 mV greater than virtual ground, at the next step 303. The level is then measured at the A/D low channel after a delay, at a following step 305. The 20 mV DC offset voltage at detector IN2 is then turned off at a next step 307, and the output of the RMS detector is then again measured at the A/D low channel after a delay at a following step 309. The output offset is then calculated and stored at a next step 311, and (input offset)$^2$ is calculated and stored at a next step 313. Some exemplary things that may cause offset voltage (DC offset) in the noise dosimeter may be the inherent output offset of the RMS detector itself; the effect due to the presence of the current injected into the detector output; and the offsets of the two operational amplifier stages of DC-coupled amplification which follow the RMS detector.

Referring to FIG. 3, to clarify the calculation of the output offset at step 311, first assume that the three aforementioned causes for offset are negligible. In such a case, the voltage measured by the A/D converter at step 305 would be 20 mV times the gains of the two DC amplifier stages (4.24 and 32) or approximately 2.7V. However, if the output offset voltage caused by the three sources listed above is not negligible, the actual voltage measured at step 305 may differ from the ideal 2.7V by an amount representative of the output offset voltage. Step 311 computes the output offset as the measurement of step 305 minus the digital level corresponding to the ideal 2.7V.

The input offset is an equivalent DC error at the RMS detector input caused by its inherent input offset plus the impact of the current injection at its output terminal. Once the output offset is computed at step 311, the input offset may be computed as being the level read at the low channel A/D input at step 309 minus the output offset. At step 309, there is no microphone signal (IN1=virtual ground) and there is no offset at IN2 of the detector (IN2=virtual ground); thus, if there were no output or input offset voltages, the voltage measured at step 309 would be zero.

When an input offset exists, the detector behaves as though it is measuring the AC-coupled audio signal plus a DC signal equal to the input offset. When an output offset is also present, the output offset is also added to the result. RMS detection is such that the result of such a measurement will be as shown in Equation 1 below:

$$\text{MeasuredOutput} = \text{OutputOffset} + \text{SQRT}(\text{InputOffset}^2 + \text{TrueInputRMS}^2) \quad (1)$$

Whenever the level at the A/D converter is small enough such that the input offset is significant, the dosimeter firmware calculates the TrueInputRMS as shown in Equation 2, which can be derived directly from Equation 1:

$$\text{TrueInputRMS} = \text{SQRT}[(\text{MeasuredOutput} - \text{OutputOffset})^2 - \text{InputOffset}^2] \quad (2)$$

When the noise dosimeter is operating in NORMAL mode, the noise dosimeter measures and displays the accumulated Noise Dose in accordance with a methodology for accumulating the sound level over time, for example ANSI S.125-1991. While in QUICK-CHECK mode, the instrument measures and accumulates the noise dose for a brief period, such as 1/32 of an hour or 112.5 seconds, and then displays the projected noise dose as if the accumulation were for a significantly longer period of, for example, 1 hour. When the noise dosimeter is operating in CAL mode, usually during manufacturing or service, the GAIN CORRECTION to accommodate for the variability in unit-to-unit microphone sensitivity may be adjusted. CAL mode may also be used to check the calibration of the noise dosimeter.

The firmware of the noise dosimeter may operate in one of the three modes NORMAL mode, QUICK-CHECK mode, and CAL mode. In all modes, the microcontroller 217 may use its internal oscillator and a clock. When the noise dosimeter starts up, the clock frequency may be set to 125 KHz and the clock may remain at 125 KHz during the "startup routine." Startup may perform various functions including checking the battery health, measuring and storing the offset errors, and reading and writing various EEPROM locations. Following startup, in both NORMAL and QUICK-CHECK modes, the clock may remain at 125 KHz (31.25 KHz instruction rate) and in CAL mode the clock may change to 500 KHz (125 KHz instruction rate) after startup. In an embodiment of the invention, the more rapid clock in CAL mode ensures a proper-looking display during its sound level meter type measurement because at some sound levels, two LEDs are rapidly and alternately turned on and off, appearing to the user as though both are on simultaneously.

The microcontroller 217 used in the design may, for example, be the PIC16F684 manufactured by Microchip Technology. There are three timer/counters in the PIC16F684, and they are labeled TIMER0, TIMER1 and TIMER2. TIMER0 and TIMER2 are both 8-bit counters and TIMER1 is a 16-bit counter. TIMER1 may be used to time the initial press of the pushbutton to determine whether the system should enter NORMAL or QUICK-CHECK mode.

The interrupt associated with TIMER0 may be enabled. In an embodiment of the invention, in NORMAL mode, TIMER0 creates $2^{17}$ interrupts during an 8-hour period of time, for example, which is equivalent to one interrupt approximately every 220 msec. Every time an interrupt occurs in NORMAL mode, the noise dosimeter system samples the detected level and updates its accumulated dose. The interrupt routine also keeps track of the overall time so that the unit automatically turns itself off after 16 hours, if the user does not do so before then.

In QUICK-CHECK mode, TIMER0 may also interrupt approximately every 220 msec. The interrupt routine, similar to its function in NORMAL mode, samples and updates the accumulated dose. In QUICK-CHECK mode, TIMER0 may also keep track of the duration for accumulation (for example, approximately 2 minutes or 1/32 of an hour) and automatically turn off the unit after about 3 minutes. Thus the user may have about 1 minute to observe the result of the QUICK-CHECK process.

In an embodiment of the invention, in CAL mode TIMER0 creates an interrupt once approximately every 0.52 seconds. CAL mode firmware keeps track of the interrupts to automatically turn off the unit after approximately 18 minutes.

Figure 4:
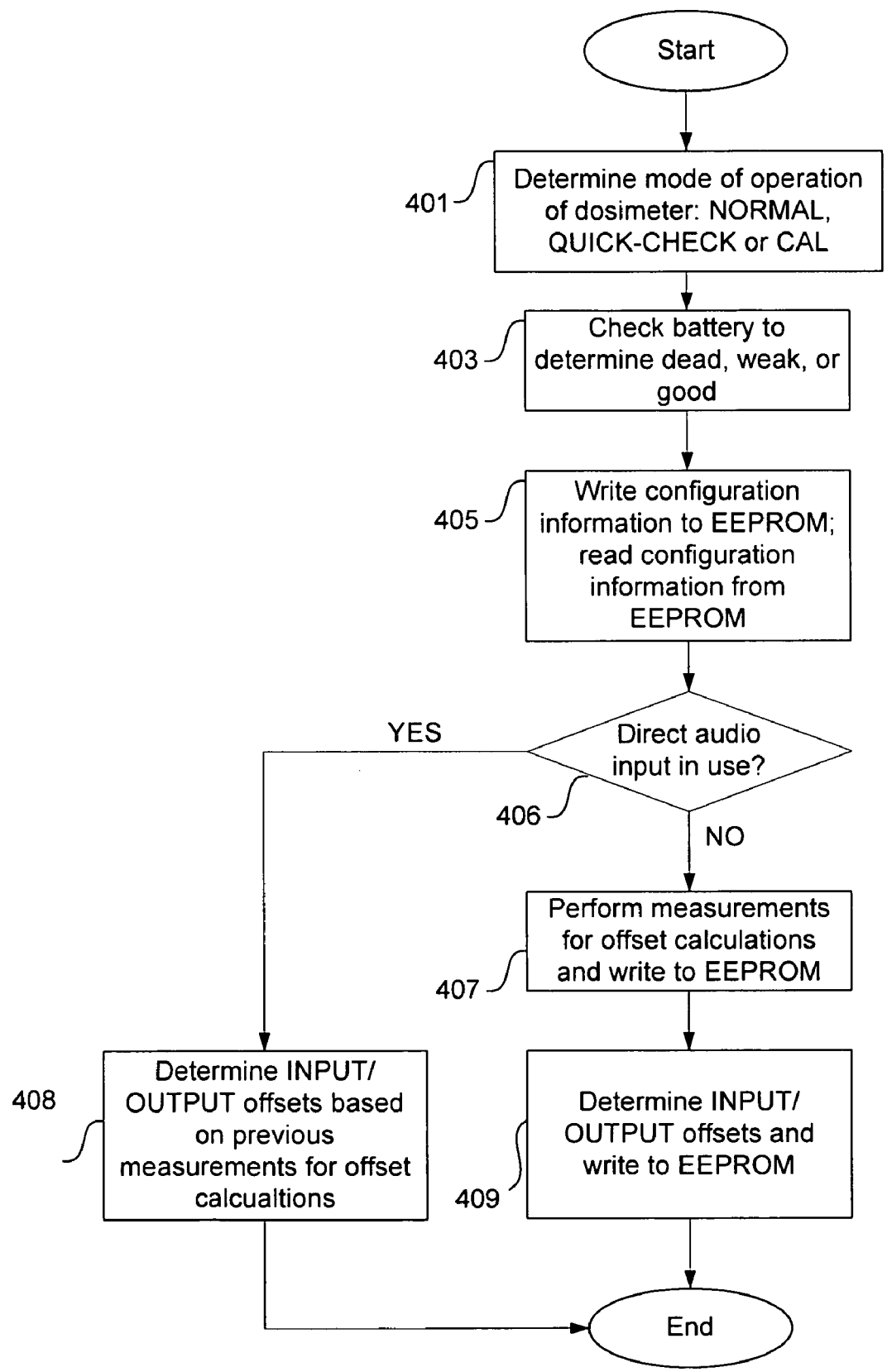
FIG. 4 illustrates a flow chart of an exemplary noise dosimeter startup sequence, in accordance with an embodiment of the present invention.
Figure 5A:
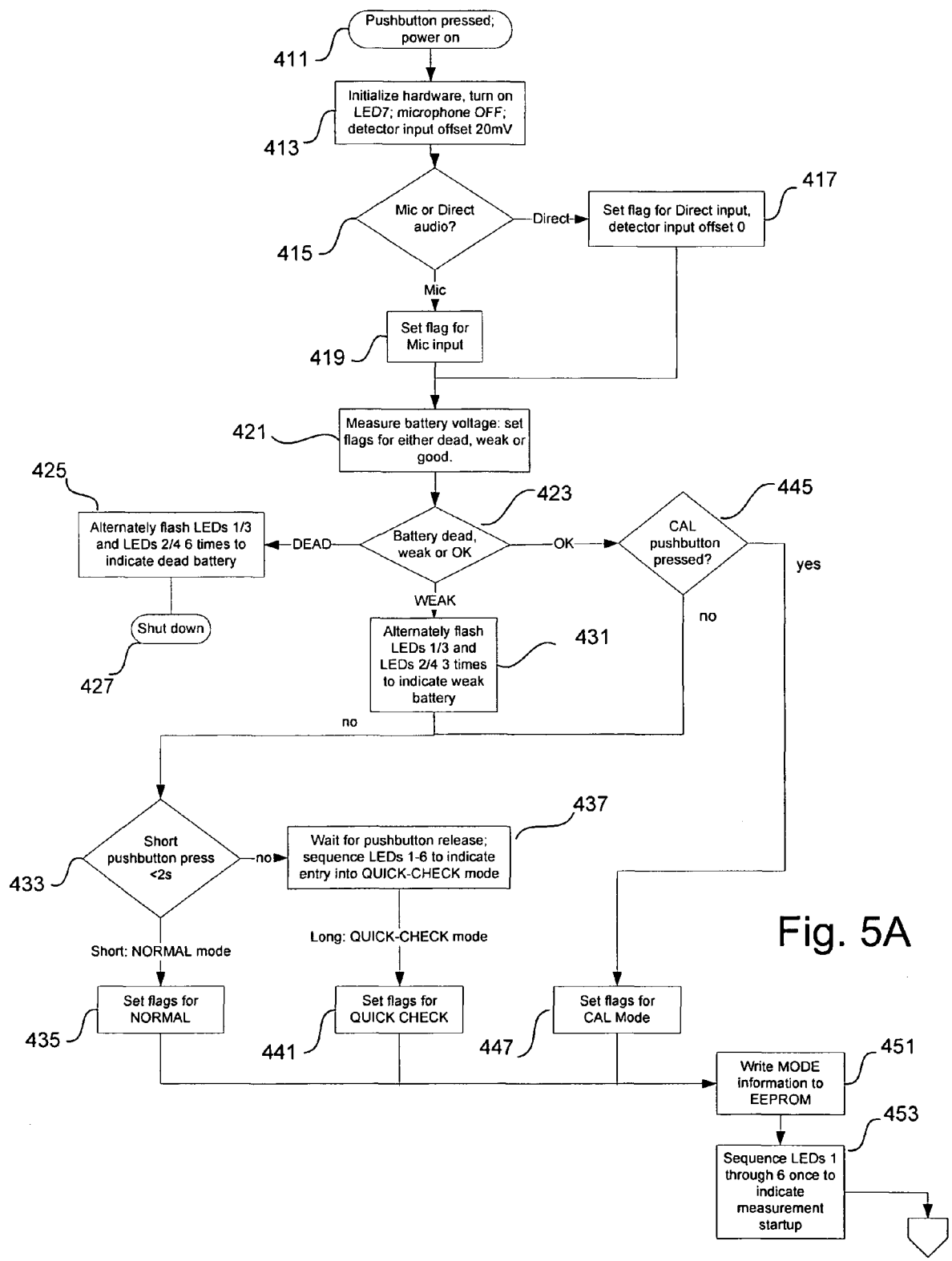
FIG. 5A illustrates a flow chart of an exemplary first part detailed noise dosimeter startup sequence, in accordance with an embodiment of the present invention.
Figure 5B:
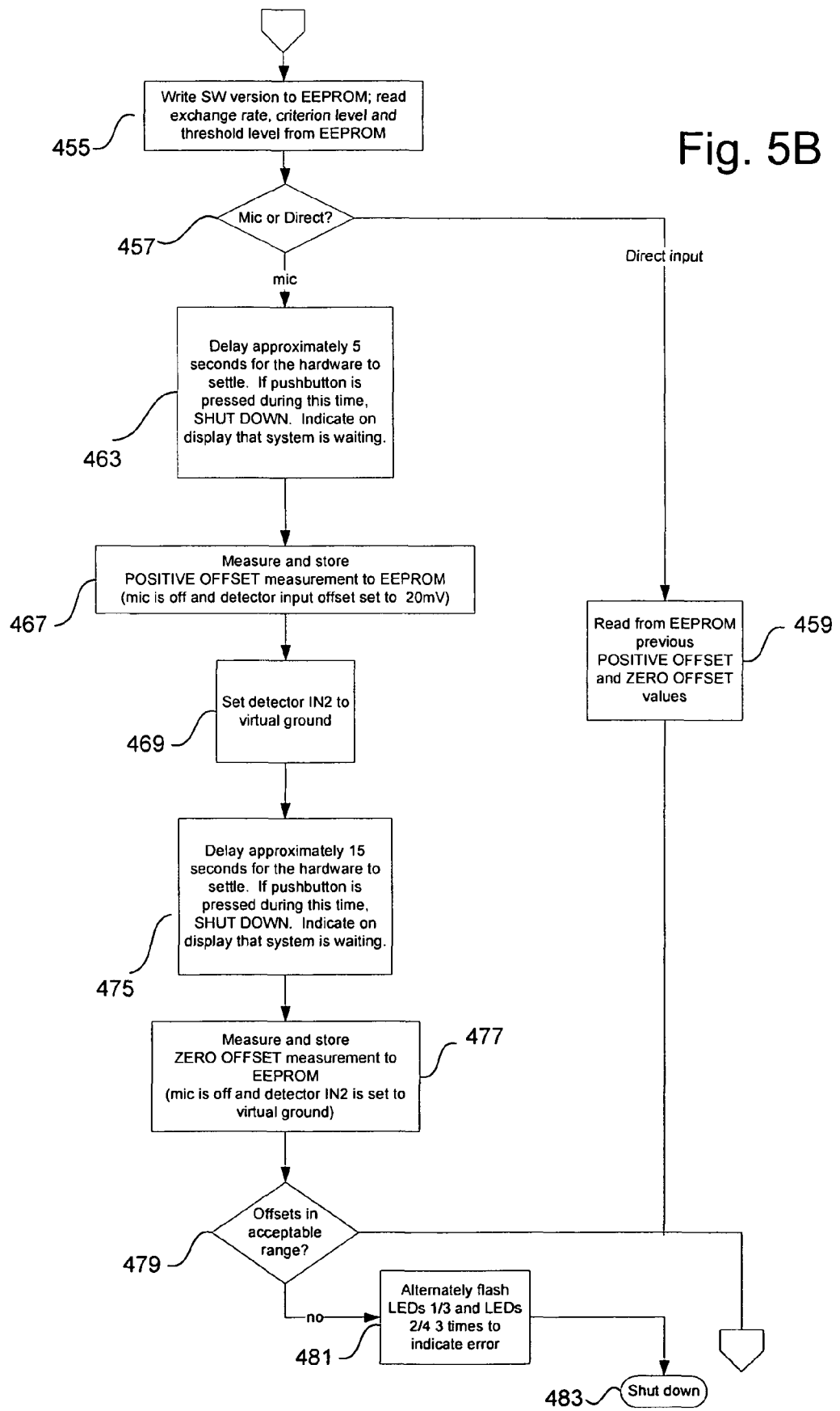
FIG. 5B illustrates a flow chart of an exemplary second part detailed noise dosimeter startup sequence, in accordance with an embodiment of the present invention.
Figure 5C:
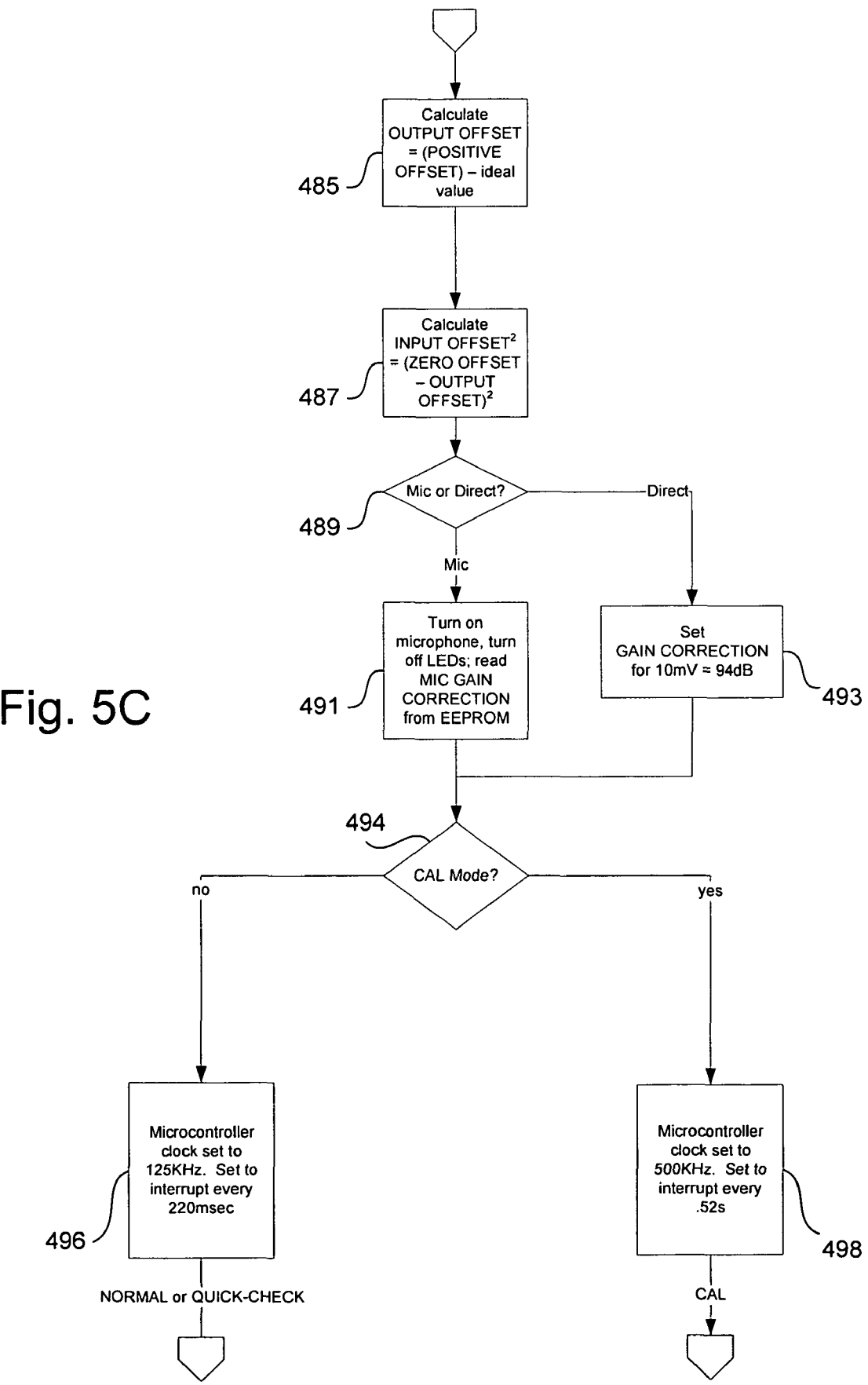
FIG. 5C illustrates a flow chart of an exemplary third part detailed noise dosimeter startup sequence, in accordance with an embodiment of the present invention.

FIG. 4 illustrates a flow chart of an exemplary noise dosimeter startup sequence, in accordance with an embodiment of the present invention and serves as an overview of the more detailed startup flowcharts of FIGS. 5A, 5B and 5C. At step 401, the dosimeter responds to pushbutton 221 being pressed, initializes its hardware and checks its battery. Hardware initialization at step 401 may comprise turning on an LED to alert the user, turning off the microphone and setting detector input IN2 to approximately 20 mV greater than virtual ground in preparation for an offset measurement which follows at step 407.

At step 403 the mode of operation of the dosimeter, which can be NORMAL, QUICK-CHECK or CAL, is determined based on the manner in which the user operates the pushbuttons 221 and 225. At step 405, information is written to and read from the EEPROM. This information may comprise calibration information and configuration information.

At a next step 406 it is determined whether or not direct audio input is in use. In an embodiment of the invention, if the presence of a direct input jack is detected, the dosimeter sets a flag indicating that it will operate with the direct audio signal rather than the signal from its integral microphone.

Step 407, which comprises steps illustrated in FIG. 3, is the measurement of the offsets of the dosimeter circuitry which may influence the accuracy of the measurement. In an embodiment of the invention, these measurements cannot take place if the direct audio input is in use and thus in that case, the process continues to step 408.

The determination of both the input and output offsets which are utilized in the determination of sound pressure level takes place at either step 408 in the case of direct audio input at jack 239 or at step 409 in the case where the microphone signal is being used. The details of step 409 comprise the use of the measurements performed at step 407, whereas the details of step 408 comprise the use of previous measurements that had been stored in the EEPROM and retrieved at step 405.

The startup process is complete after the execution of step 410 in which the appropriate GAIN CORRECTION, microcontroller clock speed and microcontroller interrupt interval are set. These settings are based upon both the chosen mode of operation and whether or not direct audio input is in use.

FIG. 5A illustrates a flow chart of an exemplary first part detailed noise dosimeter startup sequence, in accordance with an embodiment of the present invention. During a first part of the noise dosimeter startup sequence, the noise dosimeter is powered up, the battery is checked, and it is determined whether the noise dosimeter is to operate in NORMAL or CAL mode. Referring to FIG. 5A, the noise dosimeter is powered up at an initial step 411 by pressing the pushbutton 221. At this time, as explained further hereinafter, pushbutton 225 may also be pressed at the time pushbutton 221 is pressed. The hardware initializes and startup is indicated by turning on LED7 on the display 219 at a next step 413.

At a next step 415, it is determined whether the signal is received via the microphone or the direct audio input. With reference to FIG. 2, direct audio input is chosen whenever a plug is inserted into the input jack 239. If direct, a flag is set for direct input and the detector input offset is set to 0 at a next step 417. The process then proceeds to step 421. If, however, at step 415 it is determined that the signal is received via a microphone, a flag is set for microphone input at a next step 419.

Note that at startup the microphone is disabled so that no acoustic input interferes with the offset measurements which follow and the detector input IN2 is set to approximately 20 mV greater than virtual ground. Offset measurements are described in further detail below.

The battery voltage is then measured at a next step 421 and it is determined whether the battery is good, weak, or dead. Flags are set to indicate whether the battery is good, weak, or dead. If the battery is determined to be dead at step 423, LEDs 1 and 3, and LEDs 2 and 4, alternately flash 6 times to indicate the battery is dead at a next step 425 and the noise dosimeter is shut down at a next block 427.

If at decision block 423 it is determined that the battery is weak, LEDs 1 and 3, and LEDs 2 and 4, may alternately flash 3 times to indicate a weak battery at a next step 431. The process may then proceed to step 433.

If at decision block 423 it is determined that the battery is good, then, at step 445, the state of the CAL pushbutton is sensed in order to determine if the user wishes to enter CAL mode. If the CAL pushbutton is pressed, at step 447 flags are set to indicate the CAL mode. Note that CAL mode cannot be entered if the battery is weak or dead.

If at step 445 it is determined that the CAL pushbutton is not pressed, the process proceeds to step 433 where it is determined whether or not the pushbutton was pressed briefly or for a longer time, for example, 2 seconds. If it is determined that the pushbutton was pressed for a short time, indicating that the user wished to run the dosimeter in the NORMAL mode, flags are set accordingly at step 435. Otherwise, if the button press was longer than 2 seconds, at step 437 the process waits for the pushbutton release and while it is waiting LEDs 1 through 6 sequence to indicate the user's wish to run the dosimeter in QUICK-CHECK mode. When the user finally releases the pushbutton, operation proceeds to step 441 where flags are set to indicate the choice to run in QUICK-CHECK mode.

The mode information (NORMAL, QUICK-CHECK or CAL) may then be written to EEPROM at a next step 451, and LEDs 1 through 6 may be turned in sequence once to indicate measurement startup at a next block 453. The startup sequence then proceeds to the second part of the noise dosimeter startup sequence, described hereinafter.

Note that at startup both the microphone is disabled so that no acoustic input interferes with the offset measurements which follow and the detector input IN2 is set to approximately 20 mV greater than virtual ground. Offset measurements are described in further detail below.

FIG. 5B illustrates a flow chart of an exemplary second part detailed noise dosimeter startup sequence, in accordance with an embodiment of the present invention. During a second part of the noise dosimeter startup sequence, the noise dosimeter gets data for minimizing errors in the system. Referring to FIG. 5A, the measurement starts up at step 453 and then the startup sequence proceeds to step 455 of FIG. 5A, where information may be written to the EEPROM and read from the EEPROM. The information written to EEPROM may comprise firmware version, and the information read from the EEPROM may include various option settings such as exchange rate, criterion level, and threshold level.

At a next decision step 457, it is determined whether the noise dosimeter is utilizing the signal from its internal microphone or from the direct audio input jack described above with reference to FIG. 2. When the direct input is chosen, it may not be possible for the dosimeter to measure the offset values as necessary to minimize measurement errors, and thus in an embodiment of the invention, at step 459 if direct audio input is being utilized, the previous measured and stored offset values are utilized.

At step 463, there is a delay sufficient to allow the hardware to settle. With reference to FIG. 2, a delay may be necessary at this point, for example 5 seconds, to allow the capacitor 240 to settle to a value representative of 1) there being no signal at the input to the RMS detector 207 and 2) there being virtual ground plus some small voltage, for example 20 mV, at the RMS detector 207 input IN2 at this time. If the pushbutton is pressed during this delay time, the noise dosimeter may immediately shut down. Also during this time, the dosimeter may indicate to the user that a delay is taking place by a predetermined pattern on the display. The sequence then proceeds to a next step 467.

At step 467, the positive offset measurement is performed and positive offset data is stored to the EEPROM. At startup and during this step, the microphone is disabled and the RMS detector IN2 is set to virtual ground plus 20 mV. The RMS detector IN2 is then set to virtual ground at a next step 469.

At step 475, there is a delay sufficient to allow the hardware to settle. With reference to FIG. 2, a delay may be necessary at this point, for example 15 seconds, to allow the capacitor 240 to settle to a value representative of there being a virtual ground level at the RMS detector IN2 at this time, rather than virtual ground plus, for example, 20 mV, as described above at startup. If the pushbutton is pressed during this delay time, the noise dosimeter may immediately shut down. Also during this time, the dosimeter may indicate to the user that a delay is taking place by a predetermined pattern on the display. The sequence then proceeds to a next step 477.

At step 477, the zero offset measurement is read and stored in the EEPROM. During this step and the preceding delay of step 475, the microphone is off and the RMS detector IN2 is set to virtual ground. It may then be determined at a next decision block 479 whether the offsets are in acceptable ranges. If the offsets are in acceptable ranges, the process proceeds to the third part of the detailed start up sequence as shown and described with reference to FIG. 5C. If the offsets are not in acceptable ranges, LEDs 1 and 3, and LEDs 2 and 4, may alternatively flash 3 times to indicate an error at a next step 481 and then the dosimeter may shuts down at step 483.

FIG. 5C illustrates a flow chart of an exemplary third part detailed noise dosimeter startup sequence, in accordance with an embodiment of the present invention. During a third part of the noise dosimeter startup sequence, the output and input offsets are calculated. Referring to FIG. 5B, the positive offset is measured at step 467 and the zero offset is measured at step 477, and if these values are within acceptable ranged, the startup sequence proceeds to step 485 of FIG. 5C. At step 485, the output offset is calculated as the positive offset minus the ideal value, for example 2.7V as described above with reference to FIG. 3. This calculated output offset is then used at a next step 487 to calculate the input offset voltage as follows:

$$(\text{input offset})^2 = ((\text{zero offset}) - (\text{output offset}))^2$$

Note that at step 485, the output offset is stored in EEPROM and at step 487, the (input offset)$^2$ is stored in EEPROM.

At a decision block 489 a flag is checked to determine whether the signal is being received via the microphone or the direct input. If the signal is being received via the direct input, the GAIN CORRECTION is set such that 10 mV corresponds to 94 dB sound pressure level at a next step 493 and this value is subsequently used in the calculation of sound level. The process then proceeds to a following step 494.

If at step 489 it is determined that the signal is being received from the microphone, the MIC GAIN CORRECTION value is read from EEPROM and used subsequently in the calculation of sound level. The process then proceeds to a following step 494.

If the dosimeter is in CAL mode, at step 498, the clock in the microcontroller is set to 500 kHz and interrupts begin to occur every 0.52 seconds. The noise dosimeter then proceeds to operate as discussed hereinafter in FIG. 6. Although the higher clock rate in CAL mode somewhat lessens battery life, it is chosen to ensure a proper-looking display during its sound level meter type measurement because at some sound levels, two LEDs are rapidly and alternately turned on and off, appearing to the user as though both are on simultaneously.

If the dosimeter is in either NORMAL or QUICK-CHECK mode, at step 496, the clock in the microcontroller is set to 125 kHz and interrupts begin to occur every 220 msec, at a next block 477. The noise dosimeter then proceeds to operate in NORMAL mode or QUICK-CHECK mode as discussed hereinafter in FIG. 7A.

Figure 6:
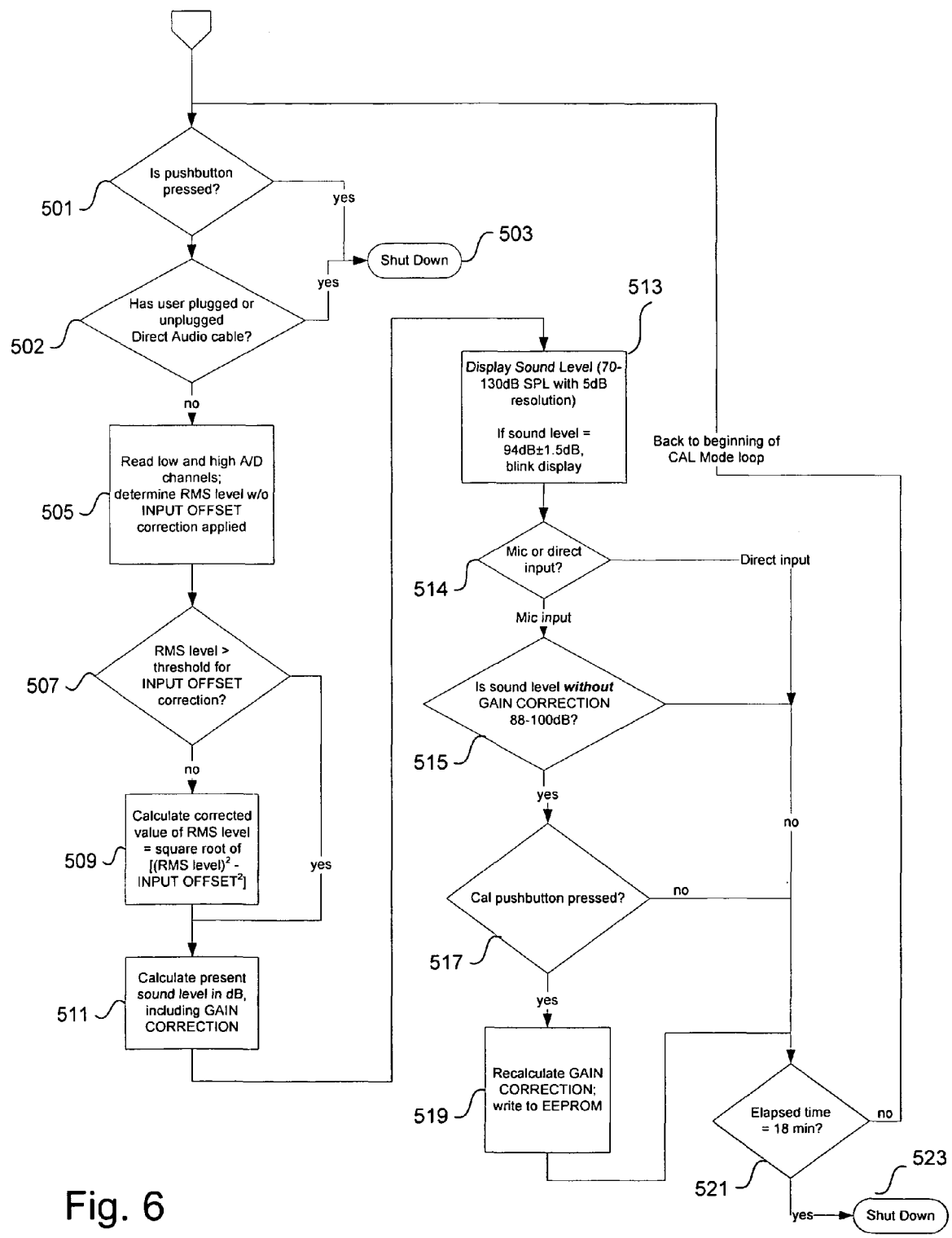
FIG. 6 illustrates a flow chart of an exemplary operation of a noise dosimeter in CAL mode, in accordance with an embodiment of the present invention.

FIG. 6 illustrates a flow chart of an exemplary operation of a noise dosimeter in CAL mode, in accordance with an embodiment of the present invention. At an initial step 501 a determination is made as to whether the pushbutton is pressed. If the pushbutton is pressed, the noise dosimeter is immediately shut down at a next step 503. Another condition which will immediately shut down the dosimeter is checked at step 502. If the user has disturbed the direct audio connection at jack 239, the dosimeter will also shut down at step 503. This is to prevent false data which is partially due to microphone input and partially due to direct audio input.

If the pushbutton is not pressed and the direct audio cable has not been plugged in or out since startup, at a next step 505, the low and high A/D channels are read. For low level signals, less than, for example 99.9 dB, the low A/D channel is used to determine the RMS level and for high level signals the high A/D channel is used to determine the RMS level. Then the output offset is subtracted to determine the RMS level without the input offset correction applied. The process then proceeds to decision step 507 where it is determined whether the RMS level is greater than a threshold for input offset correction.

If at the decision step 507 it is determined that the RMS level is greater than the threshold for input offset correction, for example an RMS level corresponding to 95 dB SPL, the input offset corrected is not applied to the measured RMS value and the process proceeds to step 511. There is no need to apply the correction for large signals because the correction will be insignificant and in an embodiment of the invention, skipping the correction of step 509 for large signals simplifies the firmware of the dosimeter by limiting the range of values to which the correction is applied.

If, however, at step 507 it is determined that the RMS level is not greater than the threshold for input offset correction, then at step 509 the corrected value of RMS level is calculated as:

corrected RMS level=SQRT[(RMS level)$^2$−(input offset)$^2$].

The process then proceeds to the next step 511.

At step 511, the present sound level is calculated in dB including the gain correction set at step 493 for direct audio input or at step 491 for microphone input. At a following step 513, the calculated sound level is displayed, for example, to be a value between 70 and 130 dB with 5 dB of resolution, in accordance with Table 2. If the sound level is 94 dB±1.5 dB then the display blinks both LED 3 and LED 4. The blinking is an indication significant when the dosimeter is exposed to an input of 94 dB SPL at its microphone or 10 mV for direct audio and thus indicates that the calibration is within 1.5 dB. At a next decision step 514, it is determined whether the dosimeter is operating with microphone or direct audio input.

If at the decision block 514 it is determined that the input is via the microphone, then at a next decision step 515, it may be determined whether the sound level without gain correction is within a range of, for example, 88 and 100 dB. This range is the allowed range over which the dosimeter may be recalibrated.

If however, at decision block 514 it is determined that the input is via the direct audio input, calibration is not available to the user and the process continues with step 521 described below. Because the primary need for calibration is due to unit-to-unit variation of microphone sensitivity, the inability to calibrate with direct audio input does not lessen the utility of the instrument.

If the sound level is determined at step 521 to not be between 88 and 100 dB, the process continues to step 521 to determine whether a predetermined amount of time has elapsed since startup in CAL mode, for example, 18 minutes. If 18 minutes have elapsed, the noise dosimeter shuts down at a next step 523. If 18 minutes have not elapsed, the process return to the decision block 501, repeating of the steps shown in FIG. 6.

If, however, at decision block 515 it is determined that the sound level is between, for example 88 and 100 dB, recalibration is permitted. Recalibration will occur if the CAL pushbutton 225 is pressed, provided the sound level is within the allowed recalibration range. If the CAL pushbutton is not pressed at this time, the, for example, 18 minute timeout is checked at step 521, as described above, either resulting in a repetition of the steps shown in FIG. 6 or in the dosimeter shutting down because the time limit has been reached.

If at the decision block 517 the CAL pushbutton is pressed, the gain correction is recalculated and written to the EEPROM at a next step 519. A unique indication that recalibration has occurred may be indicated on the display at this time. The process then proceeds to the decision block 521 to determine whether the time limit for CAL mode, for example 18 minutes, has elapsed. If 18 minutes have elapsed, the noise dosimeter shuts down at a next step 523. If 18 minutes have not elapsed, the process returns to the decision block 501.

During the CAL mode, every 0.52 sec an interrupt occurs, and the timer for the CAL mode shut off, which is checked at step 521, is incremented. This interrupt routine for CAL mode is not shown in FIG. 6.

The CAL mode may serve several purposes. One purpose of the CAL mode may be for the user to view the current sound level from 70 dB to 130 dB in 5 dB increments (LED1 only: <72.5 dB; LED1+LED2: 72.5-77.5 dB; LED2 only: 77.5-82.5 dB, etc), as specified hereinabove in Table 2. Another purpose of the CAL mode may be for the user to check the calibration for microphone sensitivity (LED3 and LED4 both on together indicate 92.5-97.5 dB; however, if LED3 and LED4 are both on and blinking together, this indicates 94 dB±1.5 dB). Yet another purpose of the CAL mode may be for the manufacturer or service technician to readjust the microphone sensitivity GAIN CORRECTION by exposing the instrument to 94 dB SPL and pressing a pushbutton attached to the 10-pin connector described hereinabove.

Figure 7A:
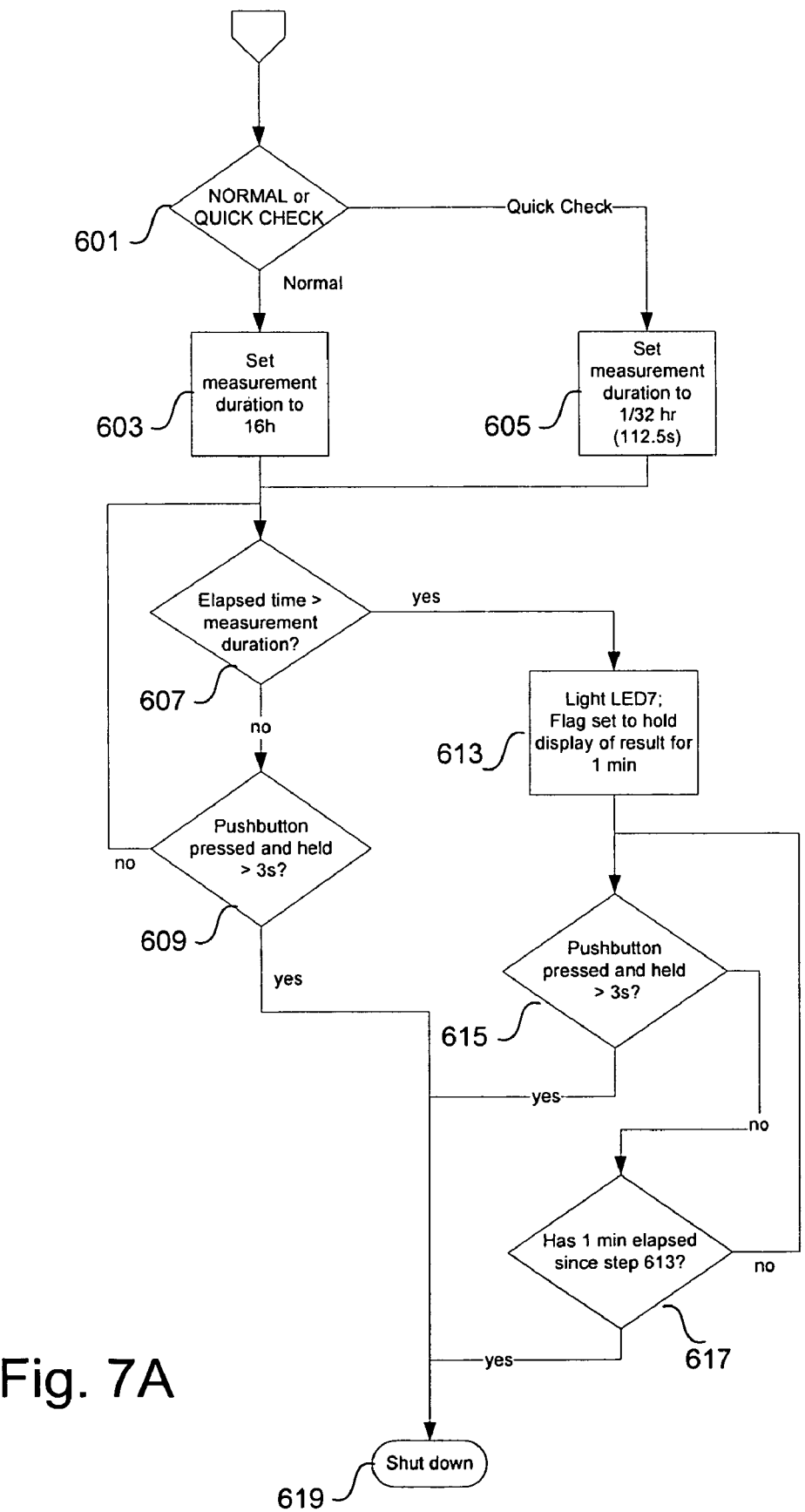
FIG. 7A illustrates a flow chart of an exemplary operation of a noise dosimeter in NORMAL or QUICK-CHECK mode, in accordance with an embodiment of the present invention.
Figure 7B:
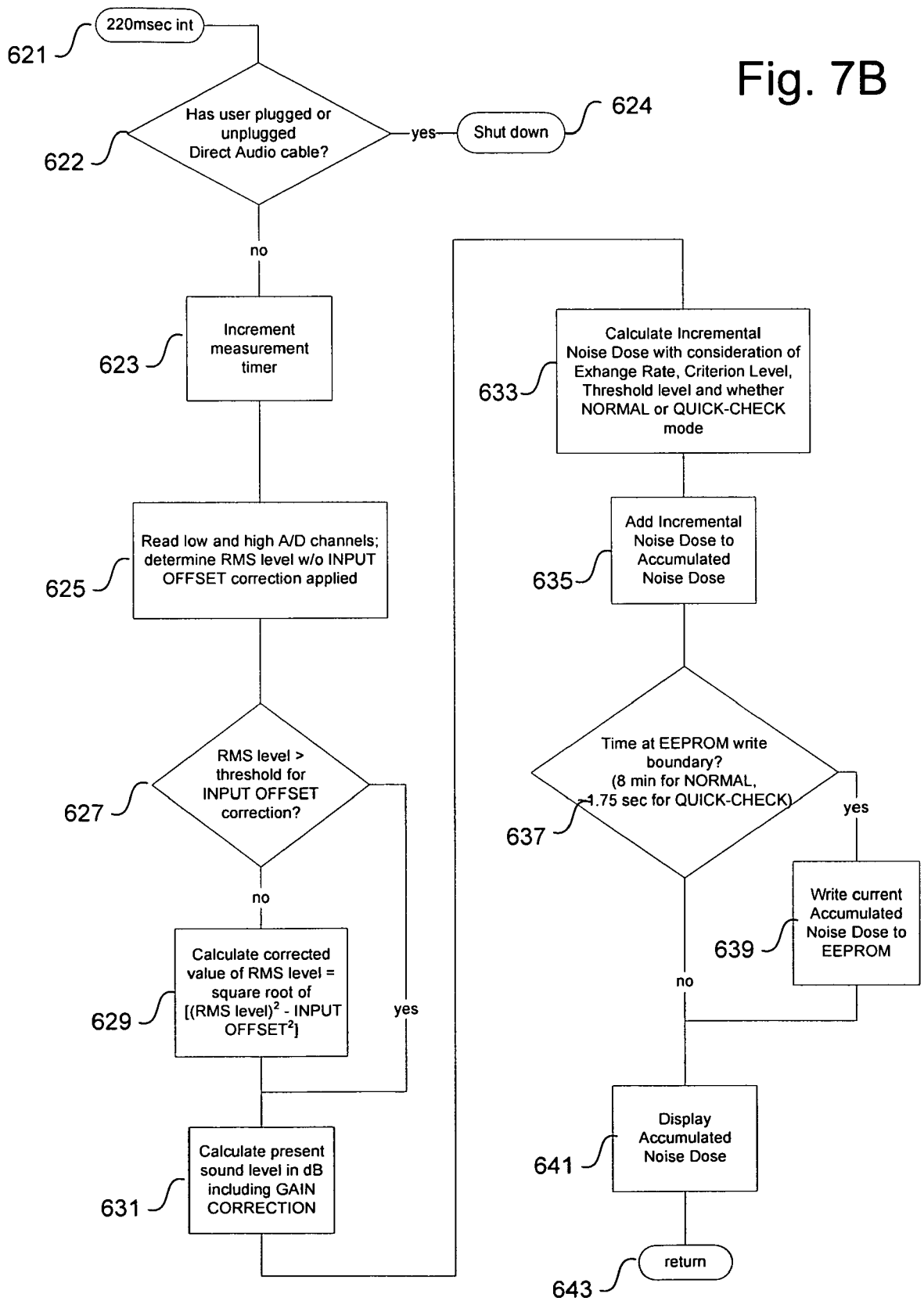
FIG. 7B illustrates a flow chart of an exemplary interrupt service routine which runs during operation of a noise dosimeter in NORMAL or QUICK-CHECK mode, in accordance with an embodiment of the present invention.

FIG. 7A and FIG. 7B illustrate a flow chart of operation of a noise dosimeter in NORMAL or QUICK-CHECK mode, in accordance with an embodiment of the present invention.

FIG. 7A illustrates a flow chart of an exemplary operation of a noise dosimeter in NORMAL or QUICK-CHECK mode, in accordance with an embodiment of the present invention. FIG. 7B illustrates a flow chart of an exemplary interrupt service routine which runs during operation of a noise dosimeter in NORMAL or QUICK-CHECK mode, in accordance with an embodiment of the present invention.

With reference to FIG. 7A, at a decision block 601 it is determined whether the dosimeter is operating in NORMAL mode or QUICK-CHECK mode. If operating in QUICK-CHECK mode, the measurement duration is set to, for example, 1/32 of an hour or 112.5 seconds at step 605. If operating in NORMAL mode, the measurement duration is set to, for example, 16 hours at step 603. The process then proceeds to step 607.

At block 607, a determination is made as to whether elapsed measure time has exceeded the measurement duration. If more than the measurement duration has elapsed since the noise dosimeter has begun measuring noise dose, the then-current display of accumulated noise dose is held fixed for a duration of, for example, 1 minute at step 613. This allows the user, especially in QUICK-CHECK mode, to view and note the result of the measurement during this display-hold period, prior to the dosimeter shutting off. LED7 may be lit at this time on the display to alert the user that the measurement is complete.

If at decision block 607 it is determined that less than the measurement duration has elapsed since the noise dosimeter has begun accumulating noise dose, a check as to whether or not the pushbutton has been pressed and held a duration of, for example 3 seconds takes place at step 609. If the pushbutton was not pressed and held, control returns to step 607 where the elapsed time is checked.

If, however, the pushbutton was pressed and held, indicating that the user wishes to turn off the dosimeter, the instrument will shut down at step 619.

An identical check as to whether or not the pushbutton has been pressed and held occurs at step 615 during the display-hold period established at step 613. This step is executed during the time the display is holding the measurement result, as described above at step 613. If the pushbutton was pressed and held, indicating that the user wishes to turn off the dosimeter, the instrument will shut down at step 619.

At step 617, executed during the display-hold period described above, the elapsed time since display hold began is checked. If the display hold time exceeds a predetermined limit, for example 1 minute, the dosimeter will shut down at step 619. If the display hold time has not exceeded the limit control returns to step 615.

FIG. 7B illustrates a flow chart of an exemplary interrupt service routine which runs concurrently with the steps shown in FIG. 7A when the dosimeter is running is NORMAL or QUICK-CHECK mode in an embodiment of the invention. During the NORMAL and QUICK-CHECK modes, the noise dosimeter determines the sound level and calculates the noise dose frequently, for example, once every approximately 220 msec. The display may show % dose according to ANSI S1.25-1991. 8 noise dose ranges may be indicated on the display, as discussed further hereinafter.

When an interrupt occurs every 220 msec, at step 621 the interrupt service routine begins. A condition which will immediately shut down the dosimeter is checked at step 622. If the user has disturbed the direct audio connection at jack 239, the dosimeter will shut down at step 624. This is to prevent false data which is partially due to microphone input and partially due to direct audio input.

If the direct audio cable has not been plugged in or out since startup, at a next step 623, the measurement timer is incremented. This measurement timer may perform several functions, including the overall timing of the measurement duration.

At a next step 625, the low and high A/D channels are read. For low level signals, less than, for example 99.9 dB, the low A/D channel is used to determine the RMS level and for high level signals the high A/D channel is used to determine the RMS level. Then the output offset is subtracted to determine the RMS level without the input offset correction applied. The process then proceeds to decision step 627 where it is determined whether the RMS level is greater than a threshold for input offset correction.

If at the decision step 627 it is determined that the RMS level is greater than the threshold for input offset correction, for example an RMS level corresponding to 95 dB SPL, the input offset corrected is not applied to the measured RMS value and the process proceeds to step 631. There is no need to apply the correction for large signals because the correction will be insignificant and in an embodiment of the invention, skipping the correction of step 629 for large signals simplifies the firmware of the dosimeter by limiting the range of values to which the correction is applied.

If, however, at step 627 it is determined that the RMS level is not greater than the threshold for input offset correction, then at step 629-the corrected value of RMS level is calculated as:

corrected RMS level=SQRT[(RMS level)$^2$−(input offset)$^2$].

The process then proceeds to the next step 631.

At step 631, the present sound level is calculated in dB including the gain correction set at step 493 for direct audio input or at step 491 for microphone input. The incremental noise dose is then calculated with consideration of exchange rate, criterion level, threshold level, and whether NORMAL or QUICK-CHECK mode at a next step 633. The incremental noise dose may be set to 0 for a sound level less than the threshold.

The calculation of accumulated noise dose in QUICK-CHECK mode differs from the calculation of accumulated noise dose in NORMAL mode. For a QUICK-CHECK duration of, for example 1/32 of an hour in an embodiment where QUICK-CHECK predicts noise exposure for one hour, the calculated value of accumulated noise in QUICK-CHECK mode is 1/32 of that which would be calculated in NORMAL mode. As another example, for a QUICK-CHECK duration of 1/16 of an hour or 3.75 minutes in an embodiment where QUICK-CHECK predicts noise exposure for one hour, the calculated value of accumulated noise in QUICK-CHECK mode is 1/16 of that which would be calculated in NORMAL mode.

At a next step 635, the incremental noise dose is added to the accumulated noise dose. At step 637, it is determined whether the time is at the EEPROM write boundary, which may be every 8 minutes for NORMAL mode or every approximately 1.75 seconds in QUICK-CHECK mode. If the time is at an EEPROM write boundary, the current accumulated noise dose is written to EEPROM at a next step 639. In an embodiment, writing data every 8 minutes in NORMAL mode results in 120 measurement data points being written over the entire 16 hour measurement interval. In an embodiment, writing data every ~1.75 seconds in QUICK-CHECK mode results in 64 measurement data points being written over the entire 112.5 second measurement interval. The process may then proceed to a next block 641.

If the time is not at a boundary, data is not written to EEPROM and execution continues with step 641, where the accumulated noise dose is displayed for the user. At a next step 643, the process may return until the interrupt occurs again.

In the NORMAL mode, the noise dosimeter performs the noise dose calculation and displays its results. The noise dosimeter may accumulate noise dose for up to 16 hours continually in NORMAL Mode and display results as specified by Table 1 hereinabove. The levels at which the indications occur may be changed in the firmware. During NORMAL mode operation, if the pushbutton is pressed and held down for about 3 seconds, the measurement process is terminated. Data held in memory may be over-written the next time the unit is turned on in NORMAL or QUICK-CHECK mode, so if a user wishes to download the dose data to a computer, the user may wish to do so before starting another measurement.

In the QUICK-CHECK mode, the noise dosimeter may determine the sound level and calculate noise dose once every approximately 220 msec. The calculation differs from NORMAL mode in that a short integration period is used, for example 1/32 of an or 112.5 seconds, and the noise dose is projected and displayed as if the accumulation were for a significantly longer period, for example a period of 1 hour.

The exchange rate, criterion level, threshold level, critical time, frequency weighting, and time weighting may be set according to ANSI S1.25-1991 as discussed earlier. The criterion and threshold levels may be easily changed. The noise dosimeter may be capable of exchange rates of 3 dB, 4 dB or 5 dB. The frequency weighting and time weighting may be implemented in hardware.

Every 8 minutes in NORMAL mode or approximately 1.75 seconds in QUICK-CHECK mode, for example, the instrument writes two bytes to its EEPROM representative of the present accumulated noise dose. In an embodiment of the invention, a 16-bit representation of accumulated noise dose has a resolution of approximately 0.2%. Thus an EEPROM value of 0001 hex represents an accumulated noise dose of approximately 0.2%, an EEPROM value of 0200 hex represents an accumulated noise dose of 100%, and the maximum EEPROM value of FFFF hex represents a noise dose of approximately 12800%.

The accumulated noise dose data may be written to EEPROM starting at address 00 hex and ending at an address no higher than EF hex, 240 bytes total. Data from previous measurements may be overwritten and to ensure that the data can be properly interpreted, the last byte of accumulated noise dose data, which is written, may be followed by FF hex.

Some information that also may be written to the EEPROM includes the firmware revision level, measured A/D levels (2 values, 2 bytes each) used in the auto-zero routine (for calculation of INPUT and OUTPUT offsets), calculated OUTPUT OFFSET (2 bytes), calculated (INPUT OFFSET)$^2$ (2 bytes), and calculated GAIN CORRECTION (2 bytes). This information may be written to EEPROM started at address F0 hex and ending at address FF hex, 16 bytes total.

Figure 8A:
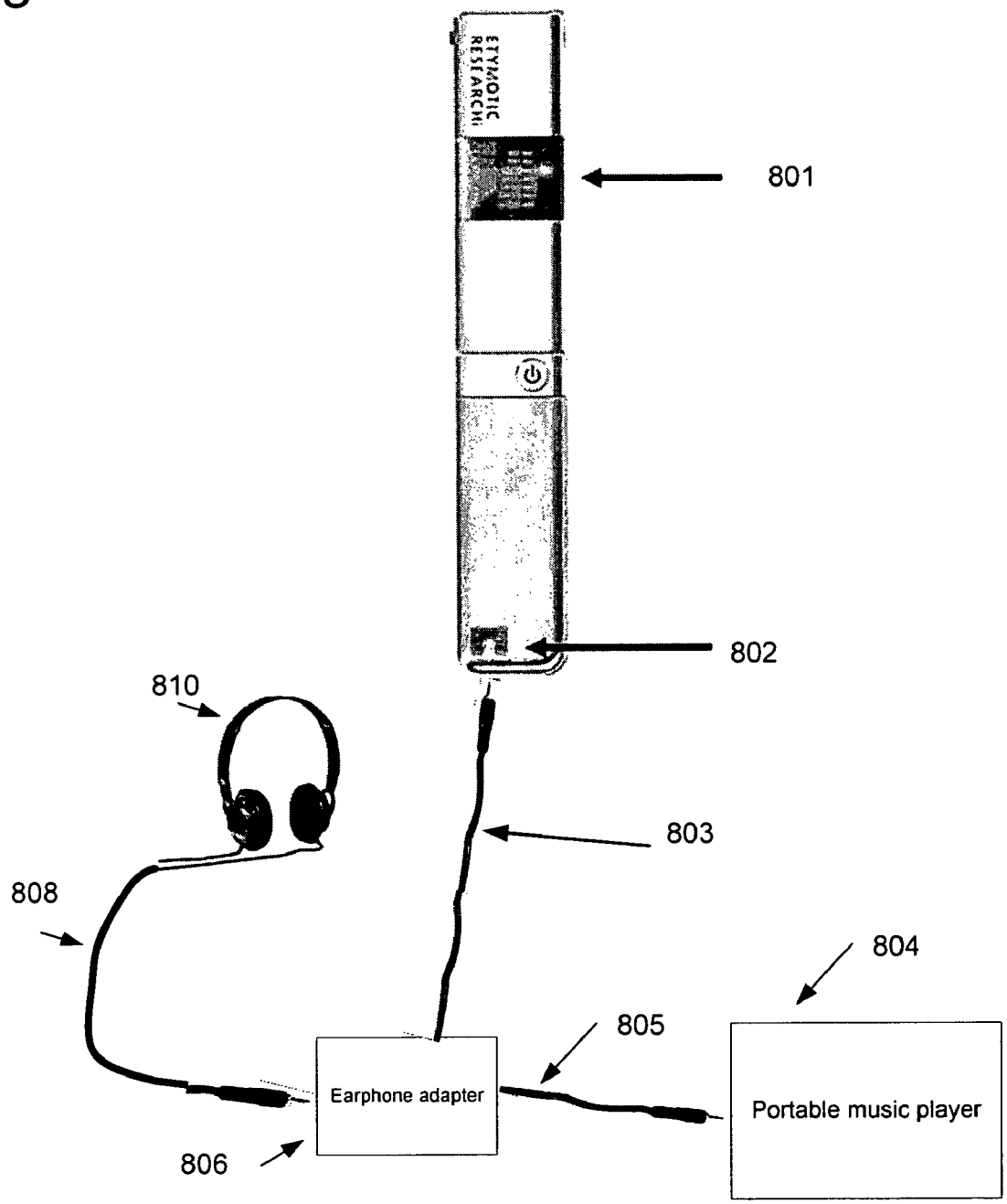
FIG. 8A illustrates a diagram of an embodiment of the present invention including an electrical earphone adapter.

FIG. 8A illustrates a diagram of an embodiment of the present invention including an electrical earphone adapter. The noise dosimeter 801 may be an exemplary embodiment of the present invention, where the noise dosimeter comprises a jack 802 for direct audio input. The direct audio jack 802 may be utilized to insert signals for testing and calibration purposes. When a direct audio signal is detected through the jack 802, the microphone is turned off, and the input signal to the dosimeter becomes the signal coming in from the jack 802.

An electrical earphone adapter 806 receives an audio signal from portable music player 804 or some other source of audio via interconnecting cable 805. The earphone adapter 806 delivers a signal to the dosimeter 801 via dosimeter input cable 803 and also may deliver a signal to an earphone or headset 810 via earphone cable 808.

In an embodiment of the invention, the earphone adapter 806 is built into the earphone cord 808. In another embodiment of the invention, the earphone adapter 806 and the dosimeter 801 are integrated together eliminating the need for a separate dosimeter input cable 803 and offering convenient monitoring of noise dose calibrated for that particular earphone or headset 810. In another embodiment of the present invention, the noise dosimeter may allow a user to know when the user's allowable daily dose of loud music has been reached or exceeded. The noise dosimeter 801 may automatically switch to earphone mode when the earphone is plugged into an active music player. When the music stops, the noise dosimeter 801 may automatically switch back to outside-microphone monitor mode.

Figure 8B:
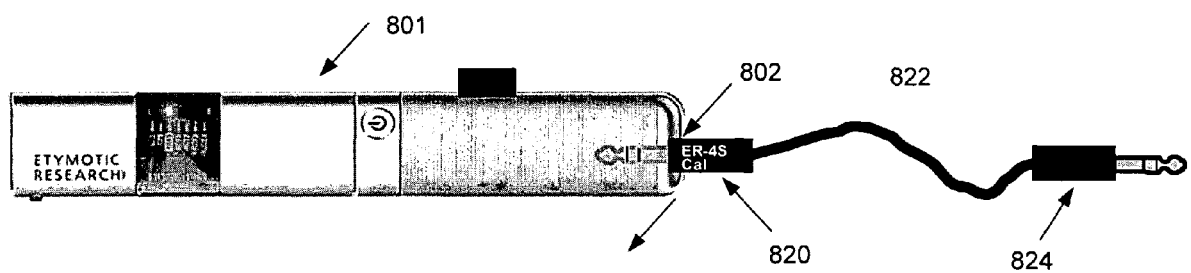
FIG. 8B illustrates a diagram of another embodiment of the present invention including an electrical earphone adapter.

FIG. 8B illustrates a diagram of another embodiment of the present invention including an electrical earphone adapter. Referring to FIG. 8B, a miniature circuit may be built into a custom assembly consisting of a dosimeter input plug 820, a cable 822 and an audio plug 824 for connection to a portable music player or some other source of audio. The dosimeter input plug 820 attaches to the dosimeter 801 at its direct audio input jack 802. Within plug 820, for example, there is located a resistive network which adjusts the voltage at the dosimeter jack 802 such that when a particular earphone or headset is delivering 94 dB, 10 mV is present at the jack 802. In one embodiment of the invention, the dosimeter is designed such that 10 mV at jack 802 is equivalent to 94 dB SPL. The embodiment of the invention illustrated in FIG. 8B does not provide the ability of a user to actually listen to the audio source while the dosimeter is connected.

In one embodiment of the invention, using a pair of resistors leading to a common shunt resistor allows mixing the signals which would be applied to both the left and right earphones. The values of the resistors are chosen such that the averaged voltage corresponds to a field-referenced earphone output with a calibration so that 10 mV corresponds to 94 dB SPL. Further, in one embodiment of the invention, the resistor values may be chosen such that the source impedance seen by the noise dosimeter input circuit is 2200 ohms, equivalent to that which the dosimeter input circuit sees when it is operating with the microphone. In this embodiment, design of the network such that the source impedance seen by the dosimeter is 2200 ohms, ensures proper calibration and frequency response. Design of resistor networks for attenuation of signals while maintaining particular input and output impedances is well-known in the field.

Field-referenced response of 94 dB SPL for a high-fidelity earphone indicates that the same eardrum pressure produced by a 94 dB SPL diffuse sound field would be produced at the eardrum by the earphone under some drive condition. By using A-weighted SPL readings, this may be simplified to the following: If a sound level meter connected to a probe microphone at the eardrum reads 94 dBA, and the earphone produced that SPL with 126 mV RMS drive, then the averaged earphone signal may be attenuated by 22 dB to produce an open-circuit voltage of 10 mV into the noise dosimeter 801.

Referring to FIG. 8A and FIG. 8B, the noise dosimeter 801 of the present invention integrates whatever energy it senses. The energy may be the result of outside noise or music when nothing is plugged into the noise dosimeter 801. The energy may also be sound-field-equivalent energy produced by the earphone 810 when the electrical earphone adapter 806 is plugged into the noise dosimeter 801. Use of the embodiments of FIG. 8A and FIG. 8B in conjunction with QUICK-CHECK mode herein described provides a convenient way to determine in a short time period what noise exposure might be experienced by someone listening to an audio source for a period of, for example, one hour.

Figure 9:
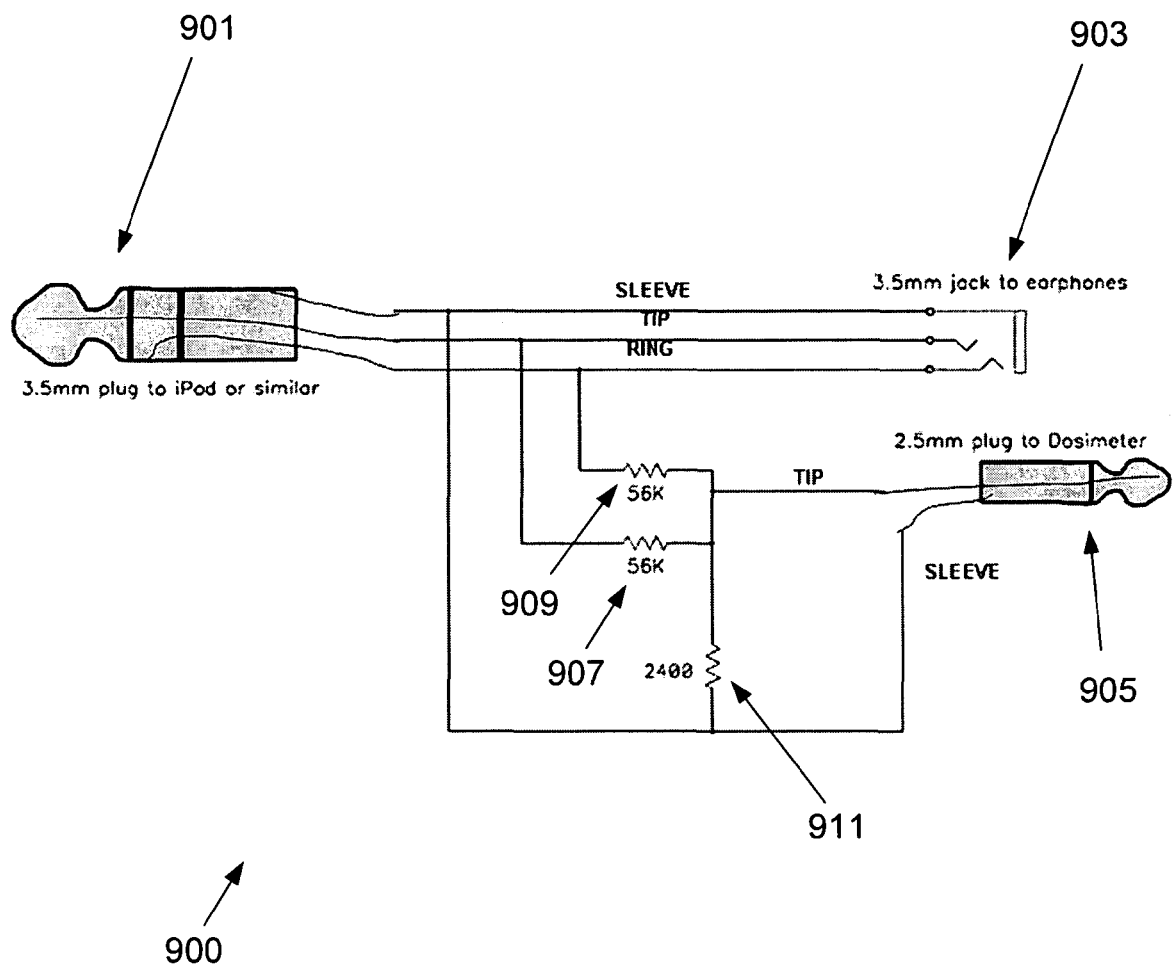
FIG. 9 illustrates an exemplary circuit of an electrical earphone adaptor in accordance with an embodiment of the present invention.

FIG. 9 illustrates a circuit diagram of an exemplary electrical earphone adaptor, 900 in accordance with an embodiment of the present invention. The adapter of FIG. 9 may be for example the adapter shown in FIG. 8A, which is connected to the noise dosimeter 801, to an audio source 804, and to a headset 810.

Referring to FIG. 9, the electrical earphone adapter cable contains two 56K ohm resistors 907, 909. The resistors 907, 909 may be connected one end to each earphone's (L and R) hot lead and the other end to a shunt 2400 ohm resistor 911 to the earphone common, the resulting pair going to a subminiature two-pin connector 905 mating with the direct audio input jack 802 of a noise dosimeter 801. The adapter cable comprises stereo jack 903, such as a 3.5 mm stereo jack, to accept a 3.5 mm headset plug. The stereo jack 903 is connected straight through to a 3.5 mm stereo plug 901 that goes to a portable music player or some other audio source. This simple network provides a properly scaled signal to the dosimeter 801 and presents to the dosimeter 801 the proper impedance.

The attenuation which results from the use of the electrical earphone adapter 900 of FIG. 9 is approximately 22 dB and is easily calculated using well-known methods.

The design of an electrical earphone adapter 900 of the type shown in FIG. 9 requires knowledge of the drive condition which causes the earphone to produce 94 dB SPL at the eardrum. For example, a more sensitive earphone may produce 94 dB SPL at the eardrum for an input level of 20 mV RMS. A less sensitive earphone may produce 94 dB SPL for an input level of 450 mV RMS. Thus an electrical earphone adapter 900 in accordance with the present invention, when configured for use with a more sensitive earphone would require an attenuation of 6 dB between the signal at plug 901 and the signal at plug 905, such that 10 mV at plug 905 corresponds to 94 dB SPL. Similarly, and electrical earphone adapter 900 in accordance with the present invention, when configured for use with a less sensitive earphone which produces 94 dB at an input of 450 mV would require an attenuator of 33 dB between the signal at plug 901 and the signal at plug 905.

Figure 10:
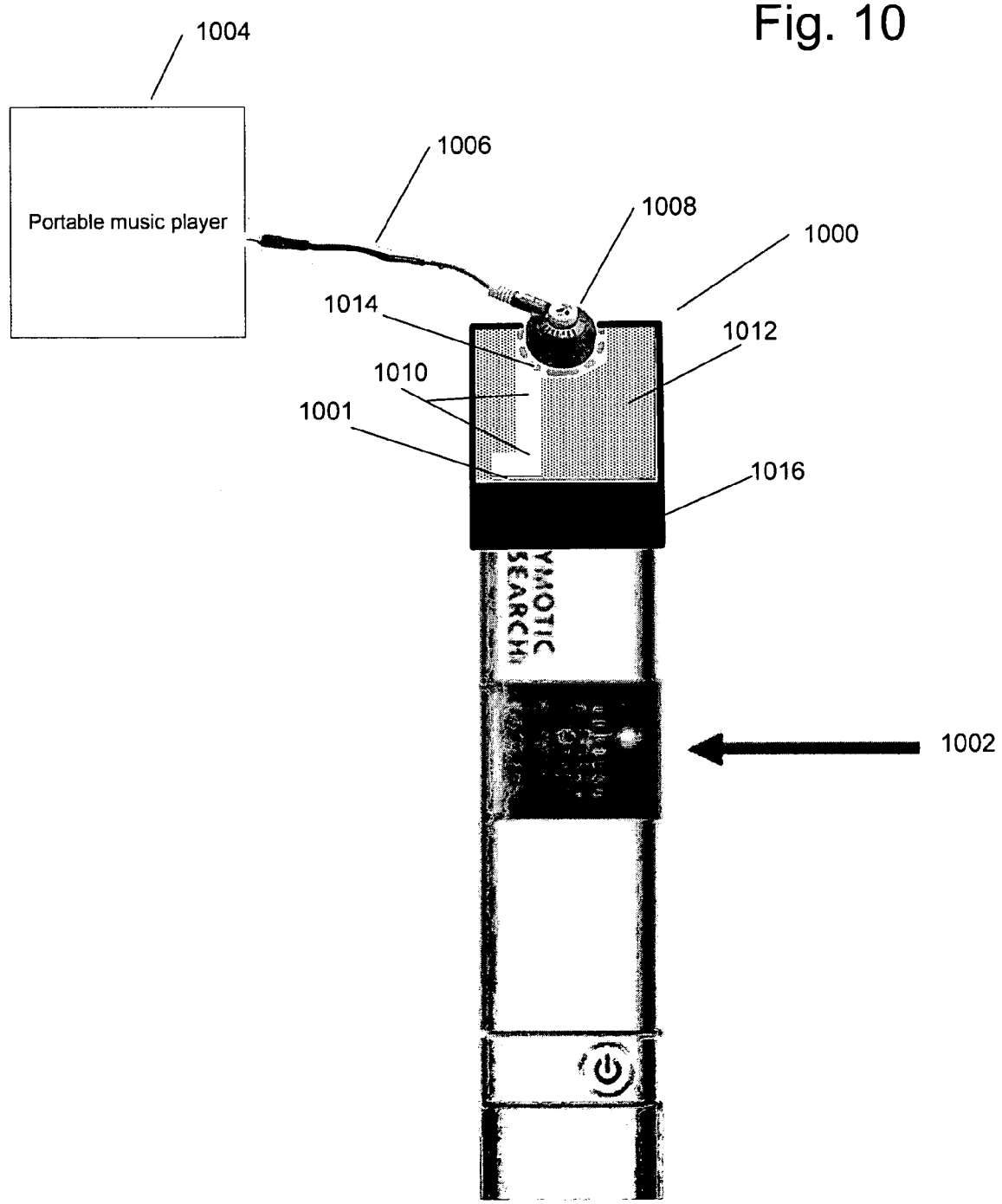
FIG. 10 illustrates a diagram of an exemplary noise dosimeter and an acoustic earphone adapter, in accordance with an embodiment of the present invention.

FIG. 10 illustrates a diagram of an exemplary noise dosimeter 1002 and an acoustic earphone adapter 1000, in accordance with an embodiment of the present invention. Acoustic earphone adapter 1000 physically attaches to the portion of noise dosimeter 1002 where the dosimeter's microphone 1001 is located. A portable music player or other sound source 1004 is attached to an earphone 1008 via cable 1006. The acoustic earphone adapter 1000 is designed to fit earphones of a specific shape and size. FIG. 10 shows a cut-away view of the earphone adapter, revealing the internal acoustic path between the earphone 1008 and the dosimeter microphone 1001. The internal material of the acoustic earphone coupler 1012 neither absorbs nor allows acoustic energy to leak out of the coupler to the outside environment.

Earphone 1008 fits into the acoustic earphone adapter 1000 in a manner which creates an acoustic seal around the outer surface of the earphone which is in close contact with the rim of the adapter at edge 1014. The adapter 1000 itself is made of a resilient material such as rubber and is designed to fit snugly over the surface of the dosimeter 1002 nearest the microphone 1001. The volume designated as 1010, which is surrounded by the internal material of the coupler 1012, serves to couple the acoustic energy from the earphone 1008 to the dosimeter's microphone 1001. An acoustic seal exists where the earphone 1008 is pressed into the acoustic earphone adaptor and another acoustic seal exists around the upper portion of the dosimeter due to the portion of the adapter 1016 which grasps the dosimeter case.

The acoustic earphone adapter's 1000 dimensions are such that, when attached to a dosimeter 1002, the sound pressure level at the dosimeter microphone 1001 is a close approximation of the sound pressure level which would occur at the eardrum of a person wearing the earphone 1008. Thus the dosimeter 1002 can estimate the noise exposure a wearer of earphone 1008 would experience. In conjunction with a dosimeter 1002 running in QUICK-CHECK mode herein described, the acoustic earphone adapter 1000 provides a convenient way to determine in a short time period what noise exposure might be experienced by someone listening to an audio source 1004 for a period of, for example, one hour.

One aspect of the present invention is a noise dosimeter having the capability to rapidly predict noise exposure in situations where the listener is exposed to sound that is of a substantially similar nature for an extended period. Such a feature may allow a user to appreciate the noise exposure a user (or others) may be subjected to if similar noise levels measured during a short duration continued for an extended period of time.

Another aspect of the present invention is a noise dosimeter having the capability to rapidly predict noise exposure in situations where the listener is exposed to sound that is of a substantially similar nature for an extended period and having the capability to receive an electrical signal representative of the sound which would be presented to a user of an earphone or earphone bud connected to external sound-producing device. Such a feature may allow a user to appreciate the noise exposure the user of the earphone or earphone bud may be subjected to if the user continued using the earphone or earphone bud at similar noise levels for an extended period of time.

Another aspect of the present invention is a noise dosimeter having the capability to rapidly predict noise exposure in situations where the listener is exposed to sound that is of a substantially similar nature for an extended period and having the capability to receive an acoustic signal representative of the sound which would be presented to a user of an earphone connected to external sound-producing device. Such a feature may allow a user to appreciate the noise exposure the user of the earphone or earphone bud may be subjected to if the user continued using the earphone or earphone bud at similar noise levels for an extended period of time.

Another aspect of the present invention may be the method and apparatus of monitoring noise exposure being directed toward an unsophisticated user. The personal noise dosimeter may also be inexpensive, and it may have a form factor compatible with being worn in social situations.

Another aspect of the present invention may be that the internal circuitry may include hardware and software for extending the dynamic range of the RMS detector. Additionally, the internal circuitry may include non-volatile memory, which may be used to store the noise dose history.

Another aspect of the present invention may be the capability of controlling another device. For example, the present invention may be incorporated into a soundboard (e.g. mixer used in a rock concert). The soundboard controls the audio level in a concert hall, for example, and often the sound exceeds limits generally considered safe. Incorporating the present invention into a soundboard may alert the sound man as to the unacceptably high level and make a record of the unacceptably high level (noise dose history) for later evaluation and consideration.

Another aspect of the present invention may include outputs that can be used to control a device external to the dosimeter such as, for example, a soundboard. Such a feature may, for the soundboard example above, force the sound man to adjust the sound by having the output signals of the dosimeter coupled to circuitry which automatically reduces the sound level.

Numerous new digital processing components are available and affordable, and may be fit for use with the personal noise dosimeter. One example of these devices may be the dsPIC ("digital signal controller") devices manufactured by Microchip Technology. Another example may be Microchip's PIC16F684. The dsPIC part includes an analog to digital converter, and also incorporates specially designed digital signal processing capability. The PIC16F684 is a less expensive and less capable component, which includes an analog to digital converter, but is not designed for high throughput digital signal processing applications.

In one exemplary embodiment of the invention, a methodology may involve performing as much of the signal processing digitally as possible, thereby minimizing the complexity of the analog components of the dosimeter. In another exemplary embodiment of the invention, the analog and digital processing may be segmented. RMS level detection and frequency weighting may be provided in analog circuitry, and the remaining processing may be performed digitally.

This highly digital approach may be implemented using a dsPIC or a similar component. The dsPIC is capable of digitally processing audio. An external ADC may be used in conjunction with the dsPIC to improve the resolution of the analog to digital conversion.

The other, less digital/more analog approach may use a simpler microcontroller such as, for example, the PIC16F684. Using a simpler microcontroller may call for analog filtering and level detection for the noise monitoring system. This analog solution may be done using an analog circuitry external to the PIC. An important component may be a level detector, since sound level measurement is based on RMS level detection and such a component as the level detector may be used to achieve such a measurement in a noise monitoring system.

Several different types of RMS detectors are available by manufacturers such as Analog Devices and Linear Technology. U.S. Pat. No. 6,098,463 titled "Method and apparatus for measurement of wide dynamic range signals" provides an improved method for detection and subsequent signal processing in wide dynamic range measurement instruments.

In an embodiment of the present invention the PIC16F684 microcontroller and the Linear Technology LTC1966 RMS Detector may be utilized. Circuitry may be utilized to improve the performance of the LTC1966 at low levels to have an extended dynamic range. The output of the RMS Detector may be coupled to two independent amplifying circuits. The output of those amplifiers may be further coupled into two analog-to-digital converter channels incorporated into the PIC. The A/D converter in the PIC may be 10 bits, which may, along with the two-channel approach, enable sufficient resolution of conversion of the analog level to digital to cover the desired dynamic range.

In an embodiment of the present invention, the noise dosimeter system may go through an automatic routine when started up, to extend the dynamic range of the RMS detector. In one embodiment of the invention the automatic routine at startup determines input and/or output offset voltages at the RMS detector or elsewhere in the circuit and stores correction factors to minimize the measurement errors caused by those offset voltages. During this routine, the processor turns off the microphone, thus preventing any audio signal from affecting the RMS detector.

In an embodiment of the present invention, alternative non-standard approaches to noise dose measurement may be employed. New standards for noise dose measurement are introduced from time to time by various researchers and by various standards organizations worldwide.

In an embodiment of the invention, repeating measurements over intervals longer and/or shorter than 16 hours may be employed. For example, 84 measurements each of 2 hour duration may be utilized to document noise exposure over an entire week, or 120 measurements each of 0.5 hour duration may be utilized to document noise exposure over an entire weekend.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A noise dosimeter, comprising:
   an electronic circuit operable to receive at least one audio signal using at least one of:
      a microphone, and
      a direct audio jack; and
   a processor within the electronic circuit operable to determine an accumulated noise dose and predict a noise exposure for an extended period based on the accumulated noise dose.

2. The noise dosimeter of claim 1 further comprising an interface operable to communicate information regarding the accumulated noise dose to a second device, wherein the interface continually communicates the information regarding the accumulated noise dose to the second device.

3. The noise dosimeter of claim 2 wherein the second device is a sound board.

4. A noise dosimeter of claim 1 further comprising an electrical earphone adapter operable to:
   receive the at least one audio signal from a sound source,
   deliver the at least one audio signal to the direct audio jack, and
   deliver the at least one audio signal to a listening device.

5. The noise dosimeter of claim 4 further comprising at least one of:
   an interconnecting cable for connecting the sound source to the electrical earphone adapter;
   a dosimeter input cable for connecting the electrical earphone adapter to the direct audio jack; and
   an earphone cord for connecting the electrical earphone adapter to the listening device.

6. The noise dosimeter of claim 4 wherein the electrical earphone adapter is built into an earphone cord.

7. The noise dosimeter of claim 4 wherein the electrical earphone adapter is integrated with a dosimeter input plug.

8. The noise dosimeter of claim 4 wherein the microphone is turned off when the at least one audio signal is detected through the direct audio jack.

9. The noise dosimeter of claim 8 wherein when the at least one audio signal is no longer detected through the direct audio jack, the noise dosimeter automatically turns on the microphone.

10. The noise dosimeter of claim 4 wherein the sound source is a portable music player.

11. The noise dosimeter of claim 4 wherein the listening device is at least one of:
   at least one earphone bud, and
   a headset.

12. The noise dosimeter of claim 1 wherein the direct audio jack is used for purposes of at least one of:
   testing, and
   calibration.

13. A method for using a noise dosimeter to predict noise exposure over an extended period, the method comprising:
   determining a present sound level;
   calculating a first incremental noise dose using the determined present sound level;
   calculating a second incremental noise dose, wherein the second incremental noise dose is a multiple n of the first incremental noise dose;
   calculating a predicted accumulated noise dose using the calculated second incremental noise dose; and
   terminating the calculation of the predicted accumulated noise dose after a brief period has elapsed, wherein the brief period is equal to 1/n of an extended period.

14. The method of claim 13 wherein said multiple n is a power of 2.

15. The method of claim 13 further comprising displaying the predicted accumulated noise dose.

16. A noise dosimeter, comprising:
   a direct audio jack operable to receive at least one audio signal, wherein the at least one audio signal received by the direct audio jack is used by the noise dosimeter to determine a predicted noise exposure from an audio source over an extended time period; and
   a dosimeter input plug with a resistive network circuit for adjusting the voltage of the at least one audio signal received at the direct audio jack.

17. The noise dosimeter of claim 16 further comprising an audio plug for connection to the audio source.

18. The noise dosimeter of claim 16 wherein the resistive network circuit of the dosimeter input plug is designed to adjust the at least one audio signal of 94 dB to 10 mV.

19. The noise dosimeter of claim 16 wherein the resistive network circuit source impedance is 2200 ohms.

* * * * *